US007226109B2

(12) United States Patent
Martin

(10) Patent No.: US 7,226,109 B2
(45) Date of Patent: Jun. 5, 2007

(54) MOVEMENT OF VEHICLE TOP OVER RECESSED ACCESSIBLE STORAGE AREA LID AND METHOD TO PRESERVE VEHICLE PROFILE

(76) Inventor: Jay R. Martin, 771 St. Johns Ave., Highland Park, IL (US) 60035

( * ) Notice: Subject to any disclaimer, the term of this patent is extended or adjusted under 35 U.S.C. 154(b) by 0 days.

(21) Appl. No.: 11/184,570

(22) Filed: Jul. 19, 2005

(65) Prior Publication Data
US 2007/0018479 A1    Jan. 25, 2007

(51) Int. Cl.
*B60J 7/20*    (2006.01)
*B60J 7/14*    (2006.01)
(52) U.S. Cl. .................. 296/107.08; 296/108; 296/131
(58) Field of Classification Search ................ 296/108, 296/124, 131, 132, 107.16, 107.17, 76, 107.2, 296/107.08, 24.4, 24.43
See application file for complete search history.

(56) References Cited

U.S. PATENT DOCUMENTS

| | | | |
|---|---|---|---|
| 2,768,024 A | 10/1956 | Spear, Jr. | |
| 2,768,025 A | 10/1956 | Spear, Jr. | |
| 2,841,441 A | 7/1958 | Evans | |
| 3,021,174 A | 2/1962 | Rund | |
| 4,634,171 A | 1/1987 | McKeag | |
| 5,078,447 A * | 1/1992 | Klein et al. | 296/107.2 |
| 5,489,134 A | 2/1996 | Furuki et al. | |
| 5,551,743 A | 9/1996 | Klein et al. | |
| 5,769,483 A | 6/1998 | Danzl et al. | |
| 5,806,912 A * | 9/1998 | Ramaciotti et al. | 296/107.09 |
| 6,062,628 A | 5/2000 | Guillez | |
| 6,092,335 A | 7/2000 | Queveau et al. | |
| 6,145,915 A | 11/2000 | Queveau et al. | |
| 6,302,470 B1 | 10/2001 | Maass et al. | |
| 6,347,827 B1 | 2/2002 | Maass et al. | |
| 6,357,815 B1 | 3/2002 | Queveau et al. | |
| 6,439,642 B2 | 8/2002 | Mac Farland | |
| 6,454,342 B2 | 9/2002 | Heselhaus et al. | |
| 6,497,447 B1 | 12/2002 | Willard | |
| 6,540,280 B2 | 4/2003 | Tamura et al. | |
| 6,578,898 B2 | 6/2003 | Rothe et al. | |
| 6,585,307 B1 | 7/2003 | Queveau et al. | |
| 6,595,572 B2 | 7/2003 | Schuler et al. | |
| 6,666,495 B2 | 12/2003 | Nania | |
| 6,679,539 B2 | 1/2004 | Guillez | |
| 6,682,125 B2 | 1/2004 | Guillez | |

(Continued)

OTHER PUBLICATIONS

Mercedes-Benz 2005 SL-Class [Brochure]. (2004). Mercedes-Benz USA, LL, Marketing Communications, 3 pages.

(Continued)

*Primary Examiner*—Dennis H. Pedder
(74) *Attorney, Agent, or Firm*—Moore & Hansen, PLLP; Allen J. Oh; Conrad A. Hansen

(57) ABSTRACT

In accordance with one preferred embodiment of the present invention, a retractable roof apparatus for a hard top vehicle is disclosed. The apparatus includes a roof portion that resides above a vehicle body forward a rear storage space when closed. Additionally, the storage space includes a lid that is configured to descend into the storage space as the roof portion moves to an open position, resting above the lid. Lastly, the open position preserves the vehicle side profile and permits storage space access. Further provided is a method of retracting a rigid vehicle roof.

23 Claims, 23 Drawing Sheets

U.S. PATENT DOCUMENTS

| | | | |
|---|---|---|---|
| 6,682,149 | B1 | 1/2004 | Guillez |
| 6,702,363 | B2 | 3/2004 | Tohda et al. |
| 6,705,662 | B2 | 3/2004 | Sande |
| 6,722,724 | B1 | 4/2004 | MacFarland |

OTHER PUBLICATIONS http://www.bodine-electric.com/Asp/ProductSeries.asp?Context=14&Name=42A%2DGB+Series+DC+Right+Angle+Hollow+Shaft+Gearmotor (3 pages).

http://www.bodine-electric.com/Asp/ProductSeries.Asp?Context=13&Name=42A%2DE+and+42A%2DF+Series+Parallel+Shaft+DC+Gearmotor&Sort=0 (3 pages).

Antoine, S.A. Three Roadster Kings, Motor Trend, vol. 55, No. 7 (Jul. 2003), pp. 6-10.

Exhibit "A" Bodine-Electric Company [Brochure] (2005), 3 pages.

Exhibit "B" Bodine-Electric Company, 2003 Catalog S-15, 6 pages.

Exhibit "C" Daytona Sunset Orange Metallic, [Brochure], 4 pages.

\* cited by examiner

MOVEMENT OF VEHICLE TOP OVER RECESSED ACCESSIBLE STORAGE AREA LID AND METHOD TO PRESERVE VEHICLE PROFILE

RELATED APPLICATIONS

This application is related to the copending application: U.S. patent application Ser. No. 11/184,342, filed Jul. 19, 2005, entitled "Motor Assisted Simultaneous Movement of Convertible Top With Trunk and Method" by Jay R. Martin.

FIELD OF THE INVENTION

The present invention relates generally to retractable vehicle roof systems. In particular, this application relates to a method and apparatus for retracting a rigid vehicle roof to an exterior storage position above the trunk while preserving the side profile of the vehicle and permitting trunk access.

BACKGROUND OF THE INVENTION

In general, open-roof designs for individualized transportation has been utilized for many years as established by carriages and the first engine-driven vehicles. Open driving was and is part of the culture of automobile driving with continued interest for contemporary designs. In the case of convertibles, it is primarily folding roofs, which are constructed in such a manner as to be able to be retracted and stretched out again, with a structure of bars and an external skin which is correspondingly foldable. Such types of folding roofs have disadvantages, particularly for reason of restricted suitability during bad weather and winter and are, due to construction, adversely affected by unpleasant wind noises at high speeds.

For increased suitability during bad weather and winter, rigid convertible folding tops, so-called hard tops were designed to provide a detachable roof, with the same paintwork and finish as the body. However, early designs were extremely expensive and complex, lending to limited production offerings.

Because of tendencies within the culture of motor vehicles at the present time, convertibles are no longer purely used as leisure-time vehicles, such as a second or third household car. Instead, such vehicles serve as a primary vehicle, leading to significant design options for hard tops which can be retracted into the vehicle space behind the passenger compartment. The most common areas for storage include a space between the passenger compartment and the trunk or within the trunk itself, thereby restricting use of the trunk space while retracted. This design is commonly referred to as an internal storage design. Alternative designs have also included storage of the hard top above the vehicle trunk for purposes of simplifying the design and maintaining a pleasing appearance. Such designs are commonly referred to as an external storage design. However, such designs impede or prevent use of the vehicle trunk while the hard top is retracted and noticeably change the appearance of the vehicle profile. Therefore, a need exists for providing a retracting system that will allow external storage of the vehicle hard top that will not significantly effect the side profile of the vehicle and permit full use of the vehicle trunk space.

The present invention provides a solution to this and other problems known in the art, and offers other advantages over the prior art.

SUMMARY OF THE INVENTION

The present invention relates to retractable vehicle roof systems which solve the above-mentioned problem.

In accordance with one preferred embodiment of the present invention, a retractable roof apparatus for a hard top vehicle is disclosed. The apparatus includes a roof portion that resides above a vehicle body forward a rear storage space when closed. Additionally, the storage space includes a lid that is configured to descend into the storage space as the roof portion moves to a recessed, open position. Lastly, the roof portion rests above the lid while preserving vehicle side profile and permitting storage space access. In addition, a method of retracting a rigid roof for a vehicle is provided.

Additional advantages and features of the invention will be set forth in part in the description which follows, and in part, will become apparent to those skilled in the art upon examination of the following or may be learned by practice of the invention.

DETAILED DESCRIPTION

Numerous vehicle hard top retracting systems exist, however the current systems available fail to provide an external open storage position above the vehicle storage lid while substantially preserving vehicle side profile and permitting storage space access The present invention will be described in preferred embodiments and is not intended to be limited as described.

Figure 1:
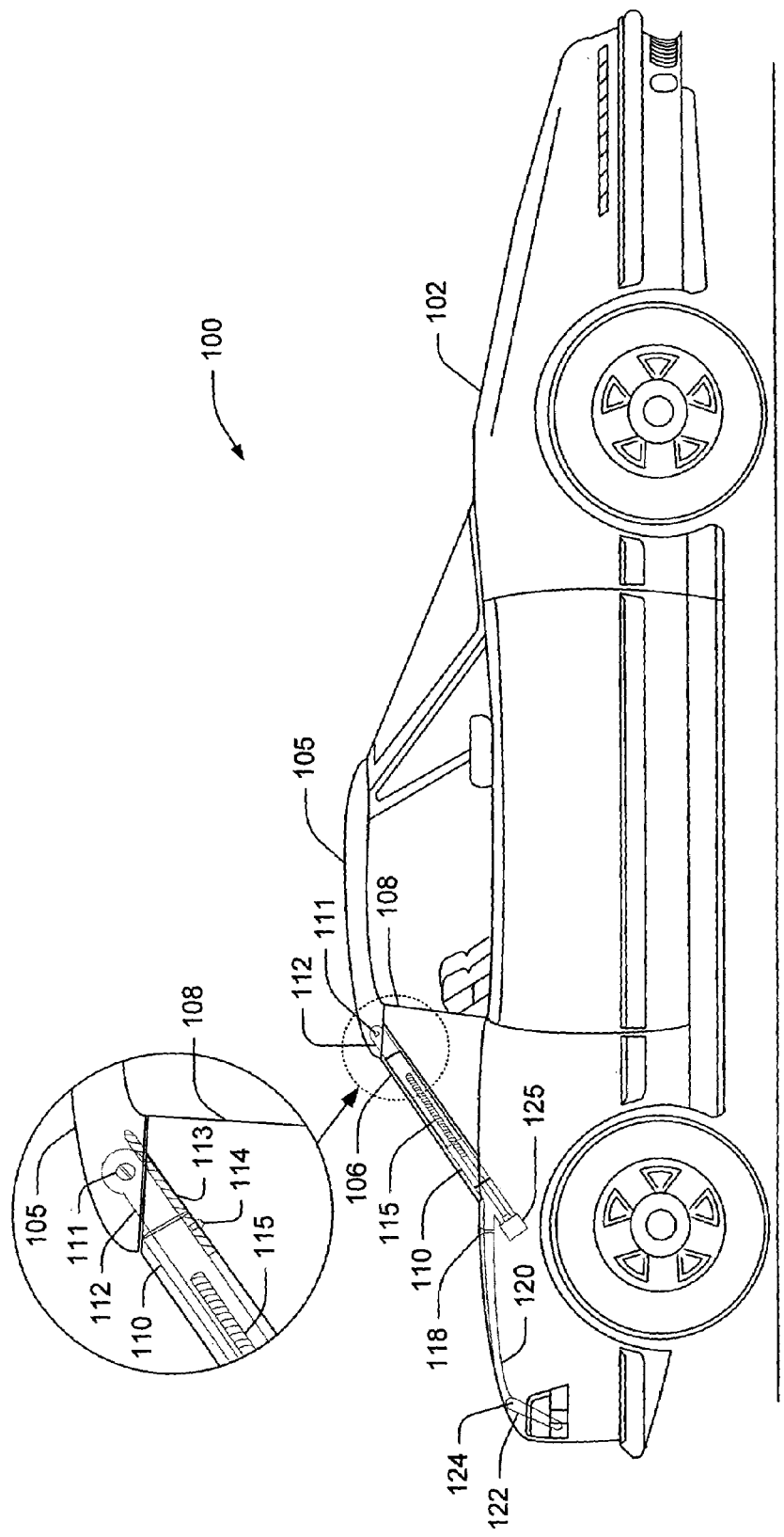
FIG. 1 is the side view of a vehicle with a rigid retractable roof viewed in the closed position.

FIG. 1 is a side view of one embodiment of the present inventions showing the roof retracting system 100 in the closed position. FIGS. 1–7 illustrate the progression of one embodiment of a retracting vehicle roof. For FIG.1, the system 100 includes a vehicle 102 having a rigid retractable roof upper portion 105 which is attached to a lower roof portion 106. Also shown in this particular embodiment is a side panel 108 which exists in some convertible roof designs in the event that no roll bar or similar structure has been incorporated. In one preferred embodiment a drive mechanism 110 may be utilized to raise and lower the upper roof portion 105 with respect to the lower roof portion 106 to assist in the retraction process. As depicted in FIG. 1, the drive mechanism 110 is operatively coupled to the upper roof portion 105 and extends to a rear storage lid of the vehicle, illustrated in FIG. 1 as having an upper lid portion 120 and a lower lid portion 122 (illustrated as a trunk lid). The upper lid portion 120 is affixed to the lower roof portion 106 at an upper hinge 118 and further attached at the opposite end by a lower hinge joint 124 to the lower lid portion 122. The construction of the drive mechanism 110 is preferably a durable material such as tube steel or composite material with similar strength and lightweight, such as a metal-loaded plastic. According to one embodiment, the drive mechanism includes a threaded rod drive that consists of a threaded rod 115 that traverses within an adjustable shaft 112 as driven by an extension motor 125. In one preferred embodiment, the motor 125 consists of a high starting torque, adjustable speed, reversible, parallel shaft DC motor similar to the N4975, manufactured by Bodine Electric Company, Chicago, Ill. The upper portion of the adjustable shaft 112 is fixed to the upper roof portion 105 at a hinge point 111. The expanded view of the drive mechanism 110 and the upper roof portion 105 illustrates that in one embodiment, the adjustable shaft 112 may be further supported by a brace 113 fastened to the adjustable shaft 112 with fastener 114.

Figure 2:
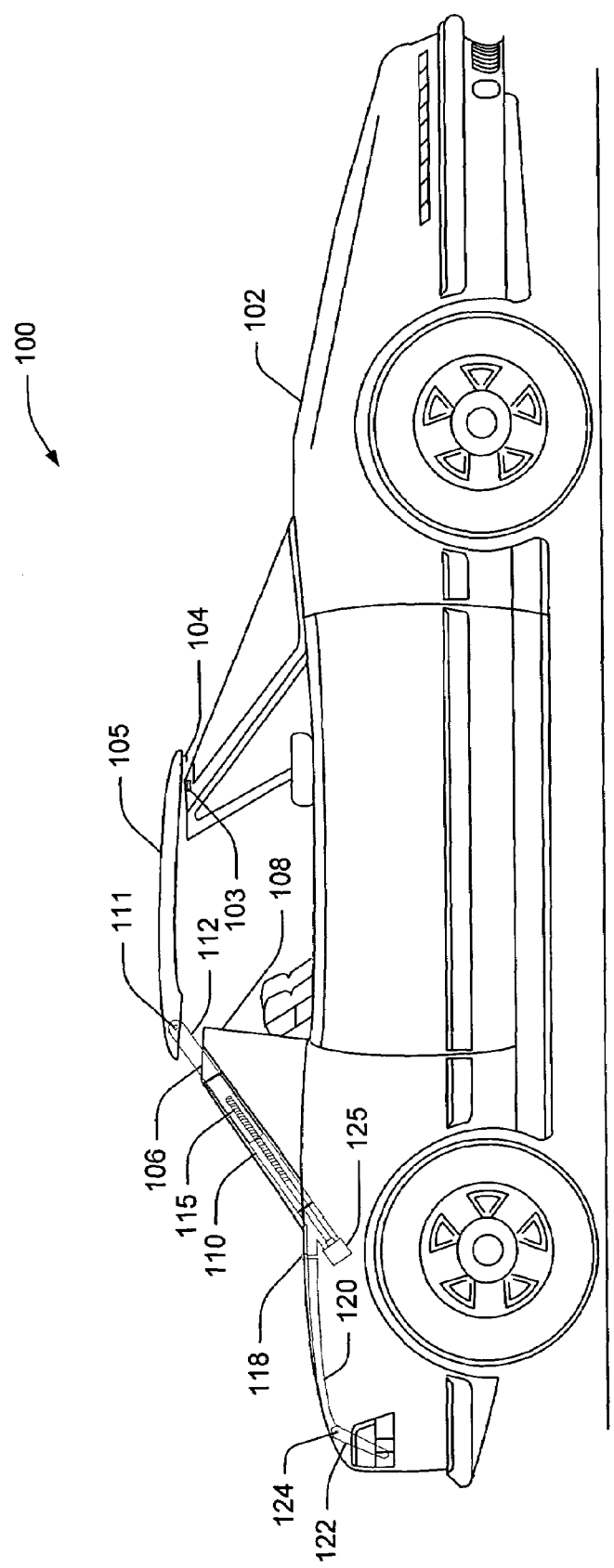
FIG. 2 is the side view of a vehicle with a rigid retractable roof viewed as the roof portion first moves from a closed to an open position.

FIG. 2 is the same roof retracting system 100 of FIG. 1 with a step toward retracting the roof of vehicle 102. This iteration illustrates how unlatching the hook 104 from the front window frame catch or hole 103 releases the front of the upper roof portion 105. In one embodiment the drive mechanism 110, as driven by operation of the extension motor 125, extends the adjustable piston or shaft 112, thereby separating the upper roof portion 105 from the lower roof portion 106.

Figure 3:
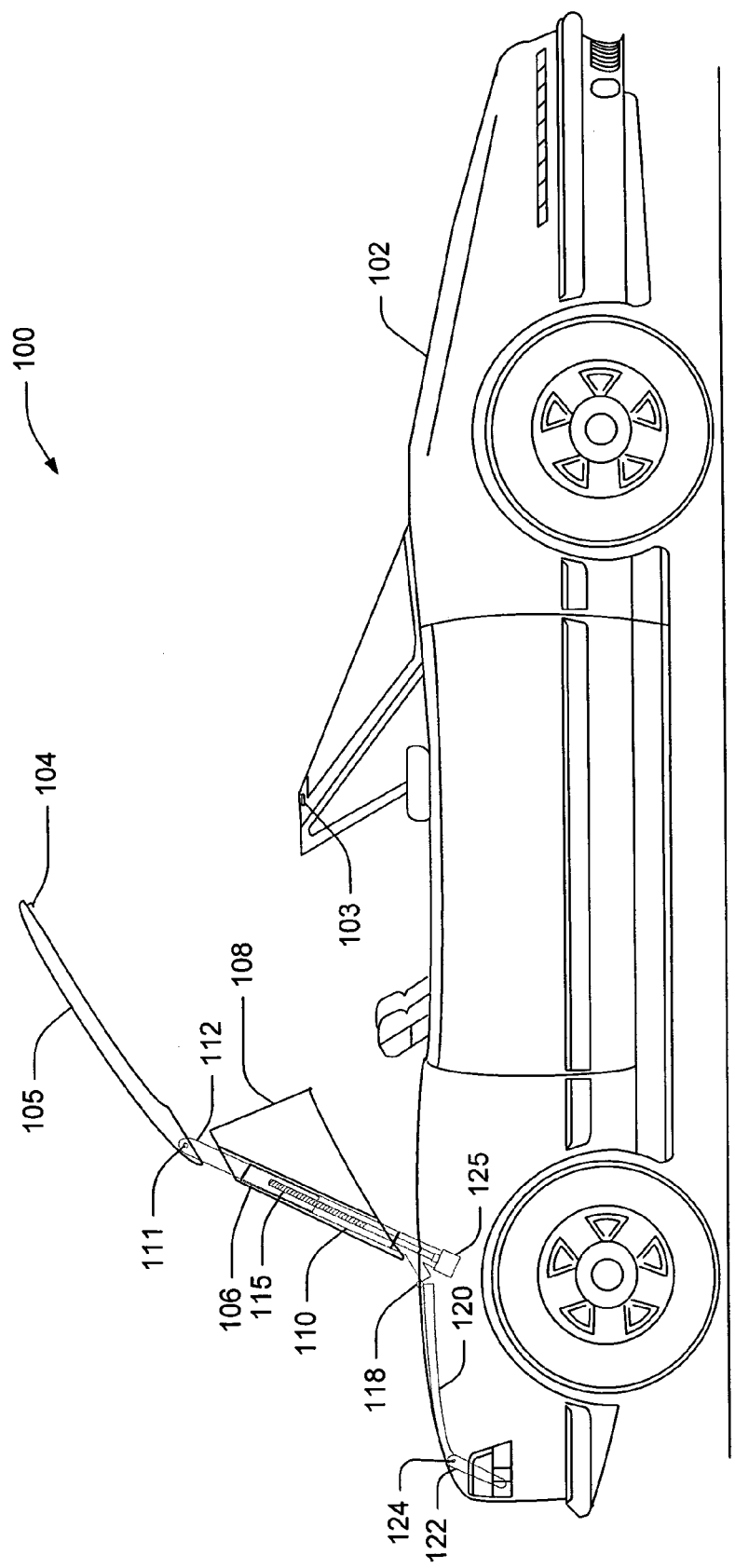
FIG. 3 is the side view of a vehicle with a rigid retractable roof viewed as the roof portion moves from a closed to an open position beyond that illustrated in FIG. 2.

FIG. 3 is a further step in the retracting of the roof of vehicle 102 using the roof retracting system 100 of FIGS. 1 and 2. This iteration illustrates the movement of both the upper roof portion 105 and the lower roof portion 106 by storage lid hinge 118. In one embodiment the force applied to move both roof portions aft the passenger compartment of vehicle 102 may be accomplished manually or by use of a drive motor. Details of alternative embodiments will be explained later in this description. According to one embodiment of the present invention a side panel 108 is hinged to lower roof portion 106 along the length of the drive mechanism 110. This allows for the side panel 108 to be rotated inward toward the opposite side of the vehicle 102 for low profile storage.

Figure 4:
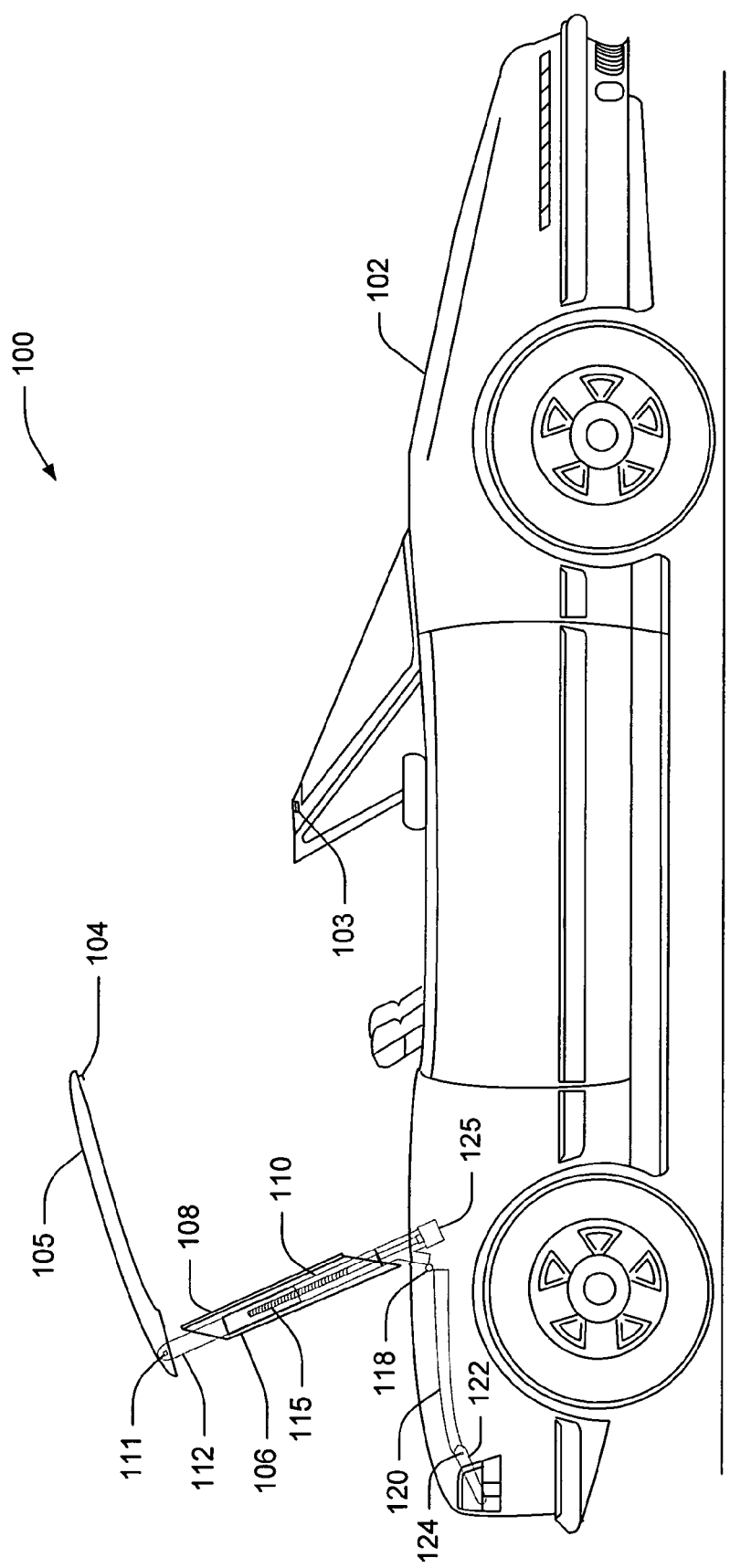
FIG. 4 is the side view of a vehicle with a rigid retractable roof viewed as the roof portion moves from a closed to an open position illustrating the folded rear quarter panels, beyond that illustrated in FIG. 3.

FIG. 4 is the same roof retracting system 100 of FIG. 1 with a further step toward retracting the roof of vehicle 102 beyond FIG. 3. This iteration illustrates the fully rotated side panel 108. Additionally shown is the upper roof portion 105 rotated to become flush with the surface of the lower roof portion 106, which is subsequently rotated to become flush with respect to the upper lid portion 120. According to one embodiment, lower lid portion 122 is rotated to become in line, adjacent to the upper lid portion 120 about lower lid pivot point 124. This illustration also shows the entire assembly of upper roof portion 105 and lower roof portion 106 with upper lid portion 120 and lower lid portion 122, descending downward toward the storage space of the vehicle 102.

Figure 5:
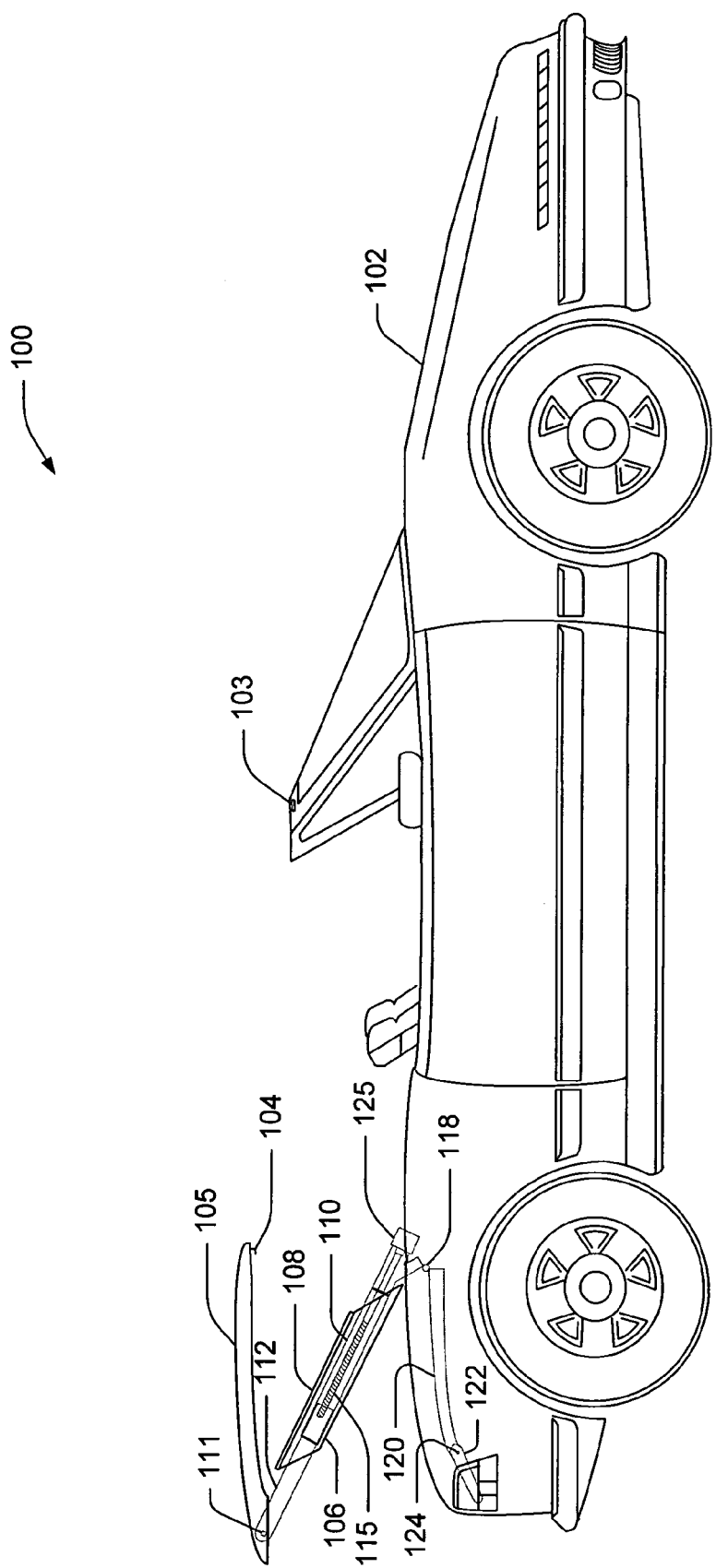
FIG. 5 is the side view of a vehicle with a rigid retractable roof viewed as the roof portion moves from a closed to an open position beyond that illustrated in FIG. 4.

FIG. 5 is the same roof retracting system 100 of FIG. 1 with a further step toward retracting the roof of vehicle 102 beyond FIG. 4. This iteration illustrates the fully extended adjustable shaft 112 in a direction opposite the upper storage lid 120, as driven by extension motor 125 within drive mechanism 110. This extension allows for the upper roof portion 105 to become more flush with the surface of the lower roof portion 106. Both upper roof portion 105 and lower roof portion 106 also rotate to become more flush with the surface of the upper storage lid 120 and lower storage lid 122.

Figure 6:
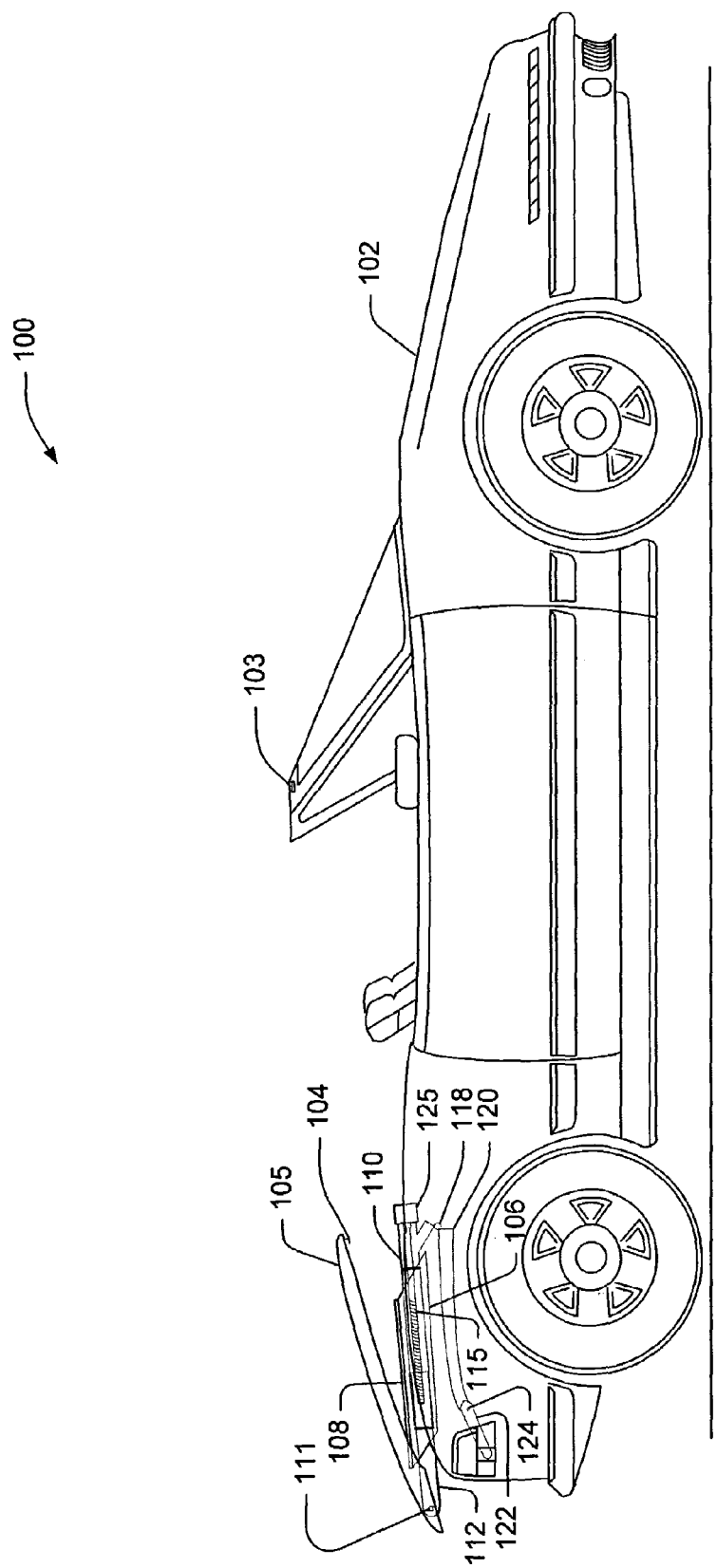
FIG. 6 is the side view of a vehicle with a rigid retractable roof viewed as the roof portion moves from a closed to an open position beyond that illustrated in FIG. 5

FIG. 6 is the same roof retracting system 100 of FIG. 1 with a further step toward retracting the roof of vehicle 102 beyond FIG. 5. This iteration illustrates the upper roof portion 105 rotated to become further flush with the surface of the lower roof portion 106, which is subsequently rotated to become further flush with the upper storage lid 120. This illustration also shows the entire assembly of upper roof portion 105 and lower roof portion 106 with upper lid portion 120 and lower lid portion 122, descending further downward toward the storage space of the vehicle 102. In one preferred embodiment, the final positioning of the upper lid portion 120 may be forward or rearward the vehicle body as is necessary to maintain vehicle side profile.

Figure 7:
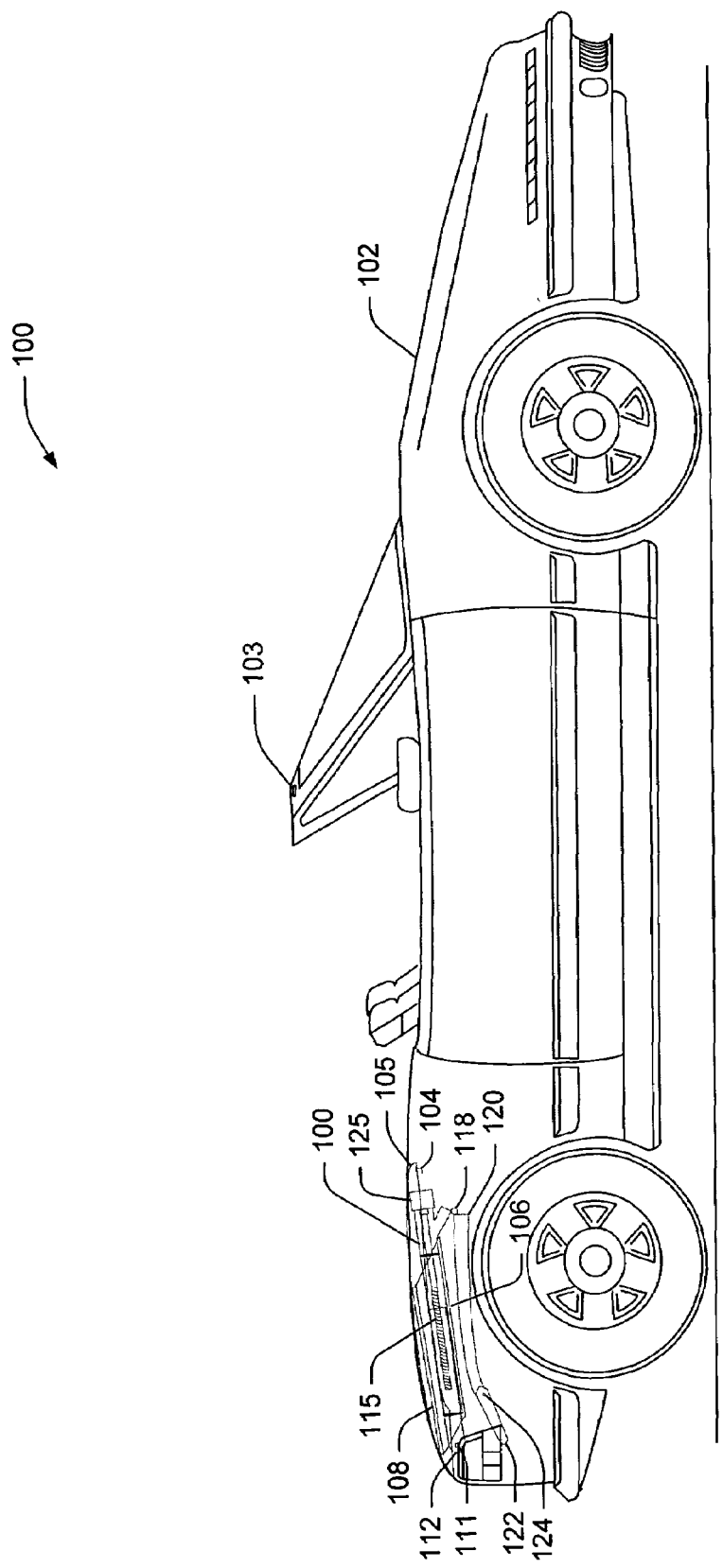
FIG. 7 is the side view of a vehicle with a rigid retractable roof viewed in the open, fully recessed position.

FIG. 7 is the same roof retracting system 100 of FIG. 1 according to one embodiment of the present invention showing the roof retracting system 100 in the open position of vehicle 102 beyond FIG. 6. This position illustrates the fully rotated upper roof portion 105 to become more flush with the surface of the lower roof portion 106, which is fully rotated to become more flush with the surface of the storage lid 120. According to one embodiment, the adjustable shaft 112 is retracted in a direction toward the front of the vehicle 102 as driven by extension motor 125 within drive mechanism 110. This illustration also shows the entire assembly of upper roof portion 105 and lower roof portion 106 with upper lid portion 120 and lower lid portion 122, fully descended downward toward the storage space of the vehicle 102. It should be noted that the side view of the open position of the roof retracting system 100 preserves the side profile, if so desired, of the vehicle 102 such that the rear storage area appears similarly to that viewed in the closed position.

Figure 8:
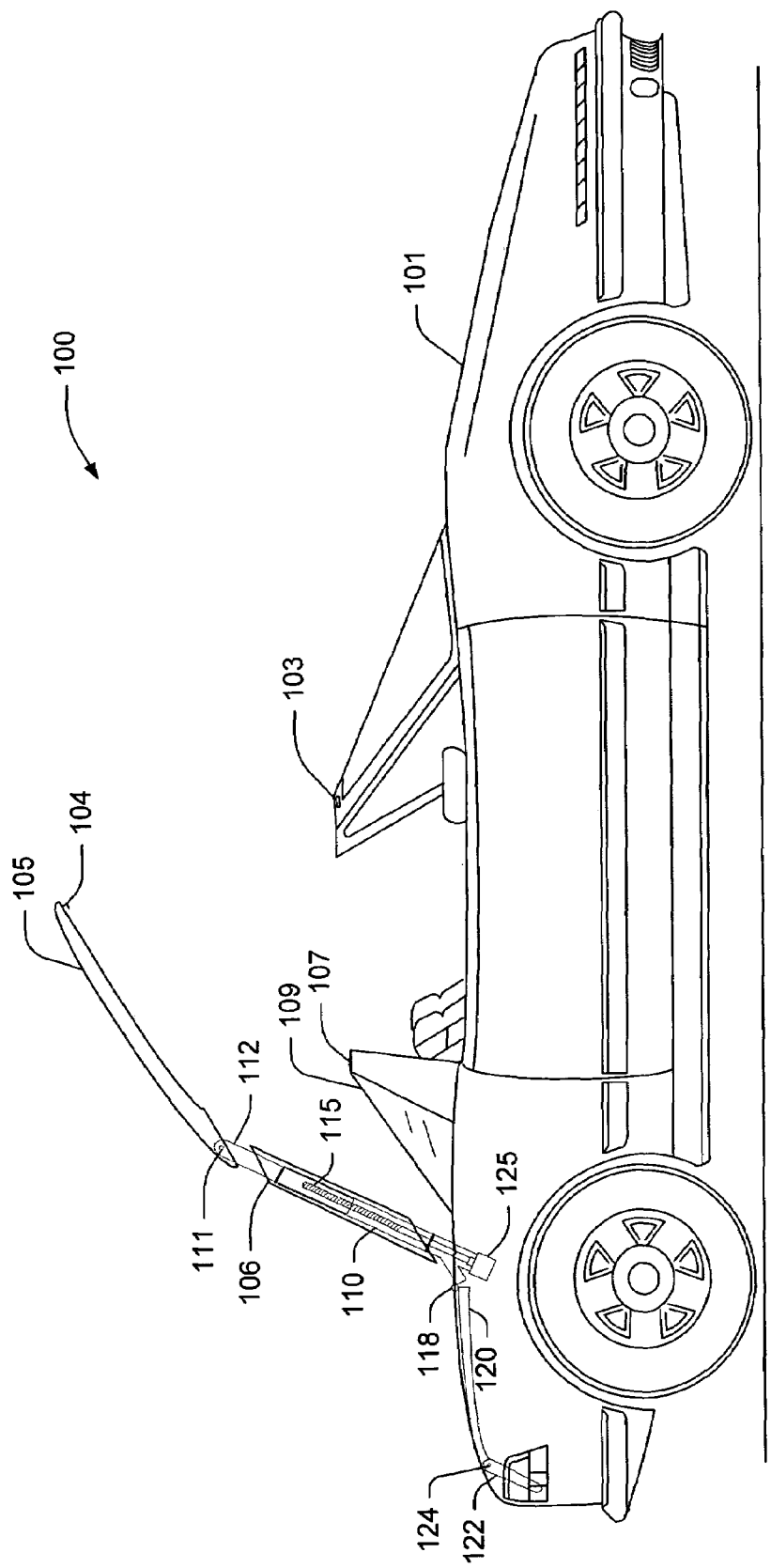
FIG. 8 is the side view of a vehicle with a rigid retractable roof, similar to FIG. 3, viewed as the roof portion moves from a closed to an open position and having a roll bar instead of rear quarter panels.

FIG. 8 illustrates one embodiment of the roof retracting system 100 such that a vehicle 101 has a fixed roll bar 107 and side panel 109. In this embodiment, there exists no hinged side panel 108 as shown in FIGS. 1–7. This illustration is most similar to FIG. 3.

Figure 9:
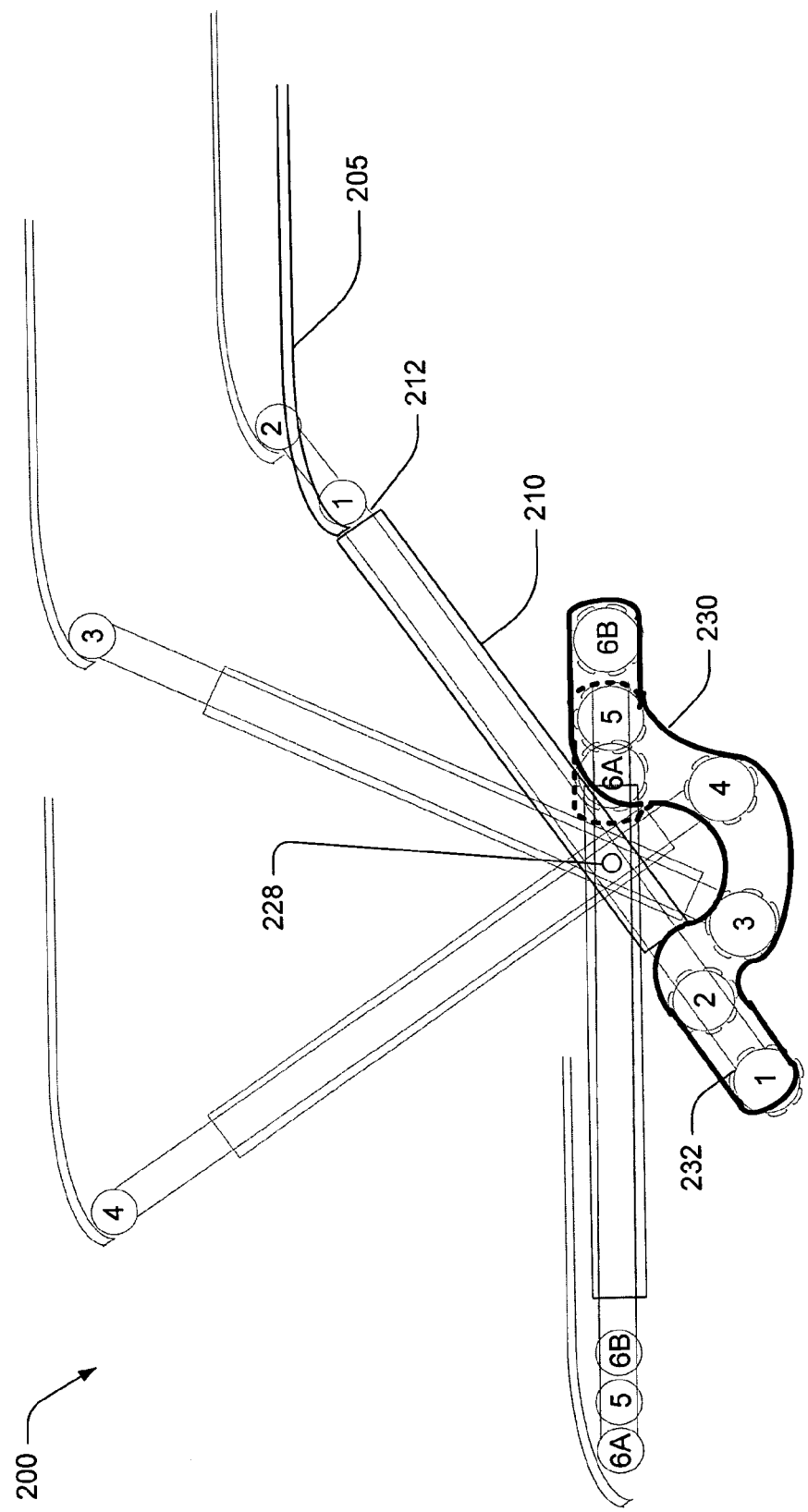
FIG. 9 is the side view of the track mechanism illustrating the various positions and numerically sequenced in ascending order from a closed to an open position.

FIG. 9 illustrates a side view of a rotational control mechanism 200 according to one embodiment of the roof retracting system 100. The numbered sequence is intended to show the different positions of a drive mechanism 210 as similarly illustrated in FIGS. 1–7. According to one embodiment, the drive mechanism 210 may be defined as a piston. An upper roof portion 205 is attached to one end of an adjustable shaft 212, while a cog 232 is attached to the opposite end. The cog 232 is designed to travel within a track 230, which is affixed to the side of a vehicle body (not shown). As the rotational control mechanism 200 rotates from the closed position 1 to the open position 6A or 6B, the entire mechanism 200 rotates about a fulcrum point 228. 6A represents one preferred final position in which the final assembly is extended rearward the vehicle body in order to maintain vehicle profile, if so desired. Alternatively, 6B represents one preferred final position in which the final assembly is extended forward the vehicle body in order to maintain vehicle profile, if so desired. Though this illustration shows the travel of the mechanism 200 to be directed by the track 230, it will be appreciated by those skilled in the art that the control may be performed manually or by automatic drive control such as a motor.

Figure 10:
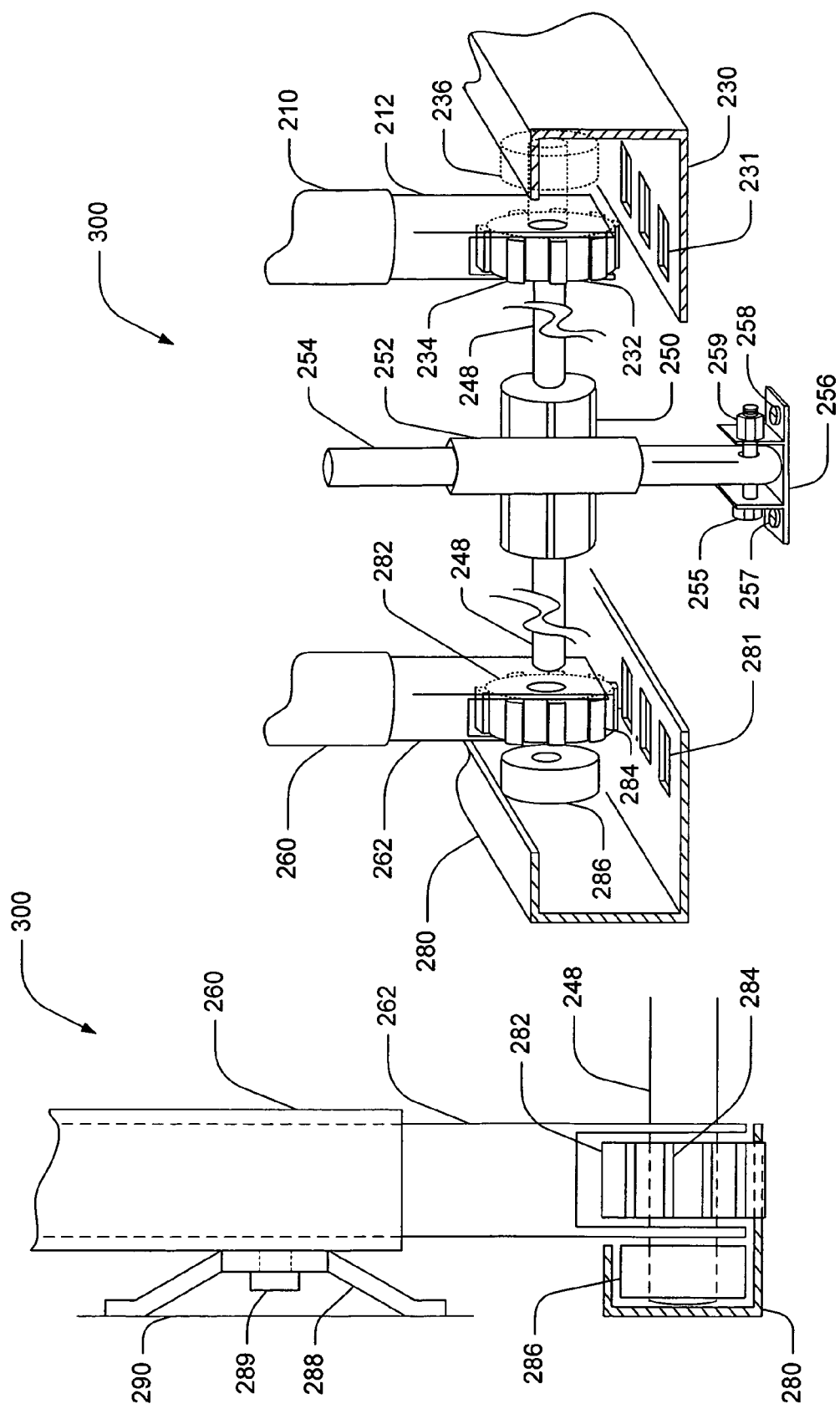
FIG. 10 is a perspective view of one preferred embodiment illustrating the cog and track mechanism, utilizing a piston and drive motor.

FIG. 10 is perspective view of a rotational control mechanism 300 according to one embodiment of the roof retracting system 100. Similar to FIG. 9, this illustration provides one embodiment utilizing two control mechanisms that may synchronously operate the roof retracting system 100 and further illustrates a forward view. The control mechanism 300 includes drive mechanisms 210 and 260 further consisting of adjustable shafts 212 and 262, respectively. Affixed at the base of each shaft 212 and 262 are cogs 232 and 282, which are designed to travel within tracks 230 and 280, respectively. According to one embodiment, the design of each cog, 232 and 282, includes tines 234 and 284 that mate with voids 231 and 281 of tracks 230 and 280, respectively. In one embodiment, travelers 236 and 286 assist the cogs 232 and 282 moving within the tracks 238 and 280. According to one aspect of the present invention, the drive mechanisms 210 and 260 may be affixed by a shaft 248 that is driven by rotation gear motor 250. In one preferred embodiment, the motor 250 consists of a high starting torque, adjustable speed, reversible, right angle hollow shaft DC gear motor similar to the 7466, manufactured by Bodine Electric Company, Chicago, Ill. Further illustrated is a guide mechanism consisting of sleeve 252 which is attached to rotation motor 250 and is positioned around guide rod 254. The guide rod 254 may be flat or round in shape and is designed to be affixed to the vehicle body using an appropriate fastener 255 and 259 secured to a mounting plate 256. The mounting plate 256 is further attached to vehicle body with fasteners 257 and 258. The forward view of the rotational control mechanism illustrates one embodiment to show the drive mechanism 260 mounted to the vehicle body 290 utilizing bracket 288 with fastener 289.

Figure 11:
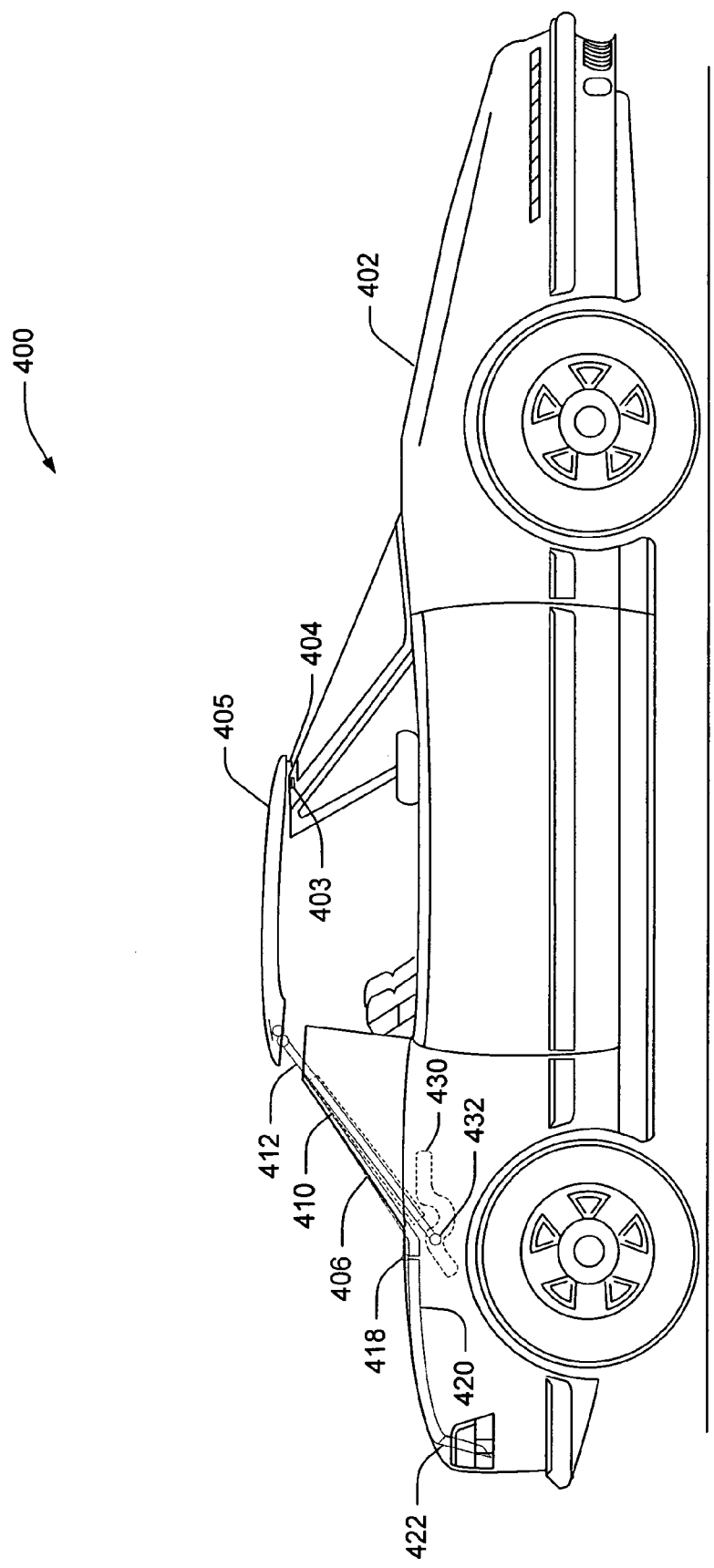
FIG. 11 is the side view of a vehicle with a rigid retractable roof, similar to FIG. 2, viewed as the roof portion moves from a closed to an open position and having a track mechanism similar to that shown in FIG. 10.

FIG. 11 illustrates a system 400, similar to FIG. 2, which includes a vehicle 402 having an upper roof portion 405 that attaches to window frame hole 403 with hook 404. The lower roof portion 406 having a drive mechanism 410, similar to FIG. 10, which includes adjustable shaft 412 that travels within track 430 as guided by cog 432. The lower roof portion 406 is further attached at the forward end of the upper storage lid 420 as affixed by upper hinge 418 and having a lower storage lid 422 at the rearward end. In one preferred embodiment, the vehicle may contain a roll bar, similar to that illustrated in FIG. 8.

Figure 12:
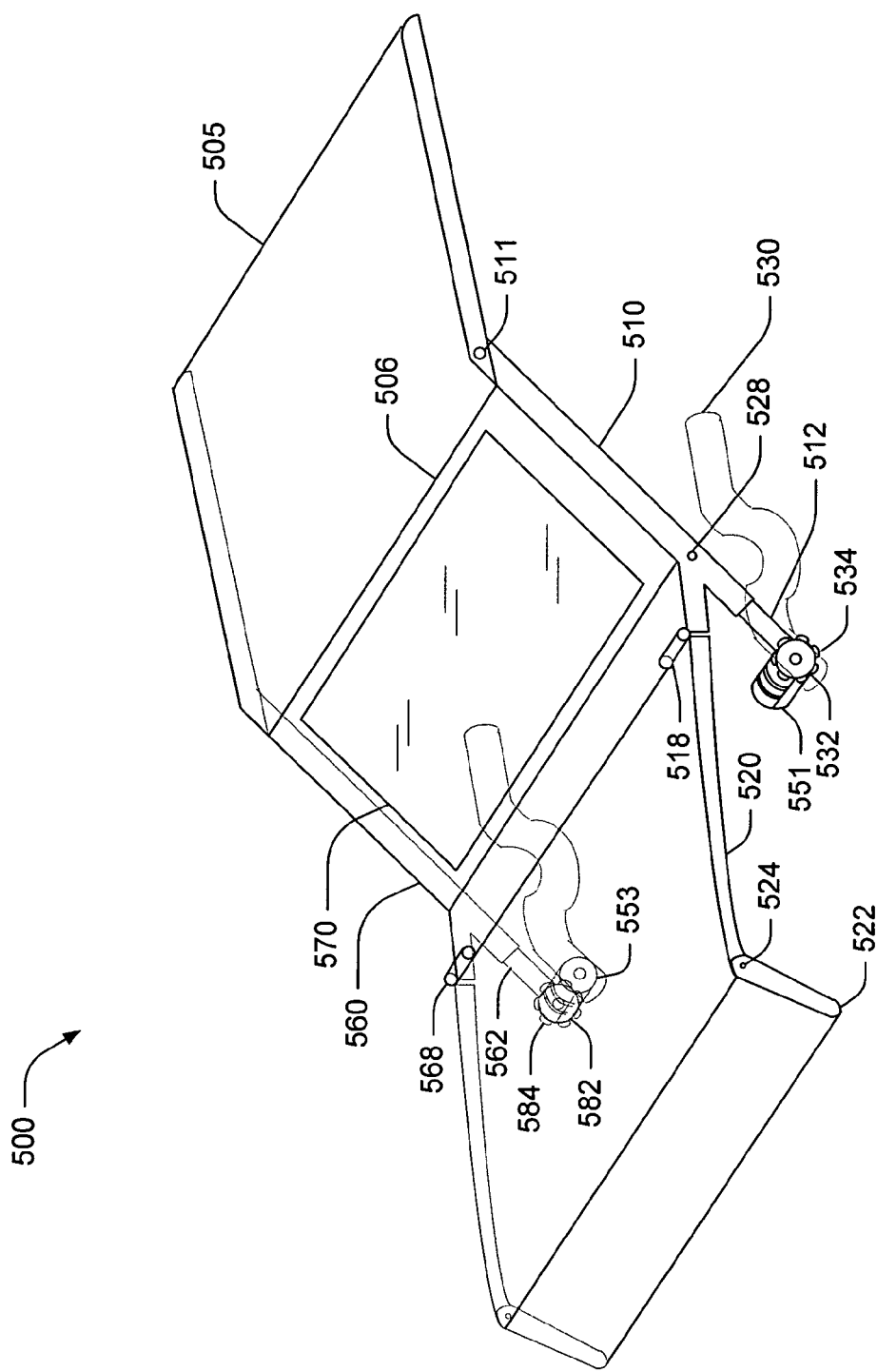
FIG. 12 is a perspective view of one preferred embodiment illustrating a cog and piston mechanism for each side of the roof portion, each having independent drive motors.

FIG. 12 illustrates a perspective view of a rotational control system 500 similar to that shown in FIGS. 9 and 10 as used on a roof retracting system 100 within the scope of this invention. Similar items are designated similarly to previous illustrations such that the upper roof portion 505, similar to FIG. 1 upper roof portion 105, is adjacent to drive mechanisms 510 and 560, positioned to rotate about fixed fulcrum 528. The rotation pivots the lower roof portion 506, containing window 570, with the upper lid 520 about hinge points 518 and 568. This is similarly labeled as elements of FIGS. 9 and 10 which include upper roof portion 205, drive mechanisms 210 and 260, rotating about fixed fulcrum 228. FIG. 12 illustrates one embodiment of the present invention which may include independent cog gear motors 551 and 553 used to synchronously drive cogs 532 and 582, through their respective tracks 530 and 580, as guided by tines 534 and 584.

Figure 13:
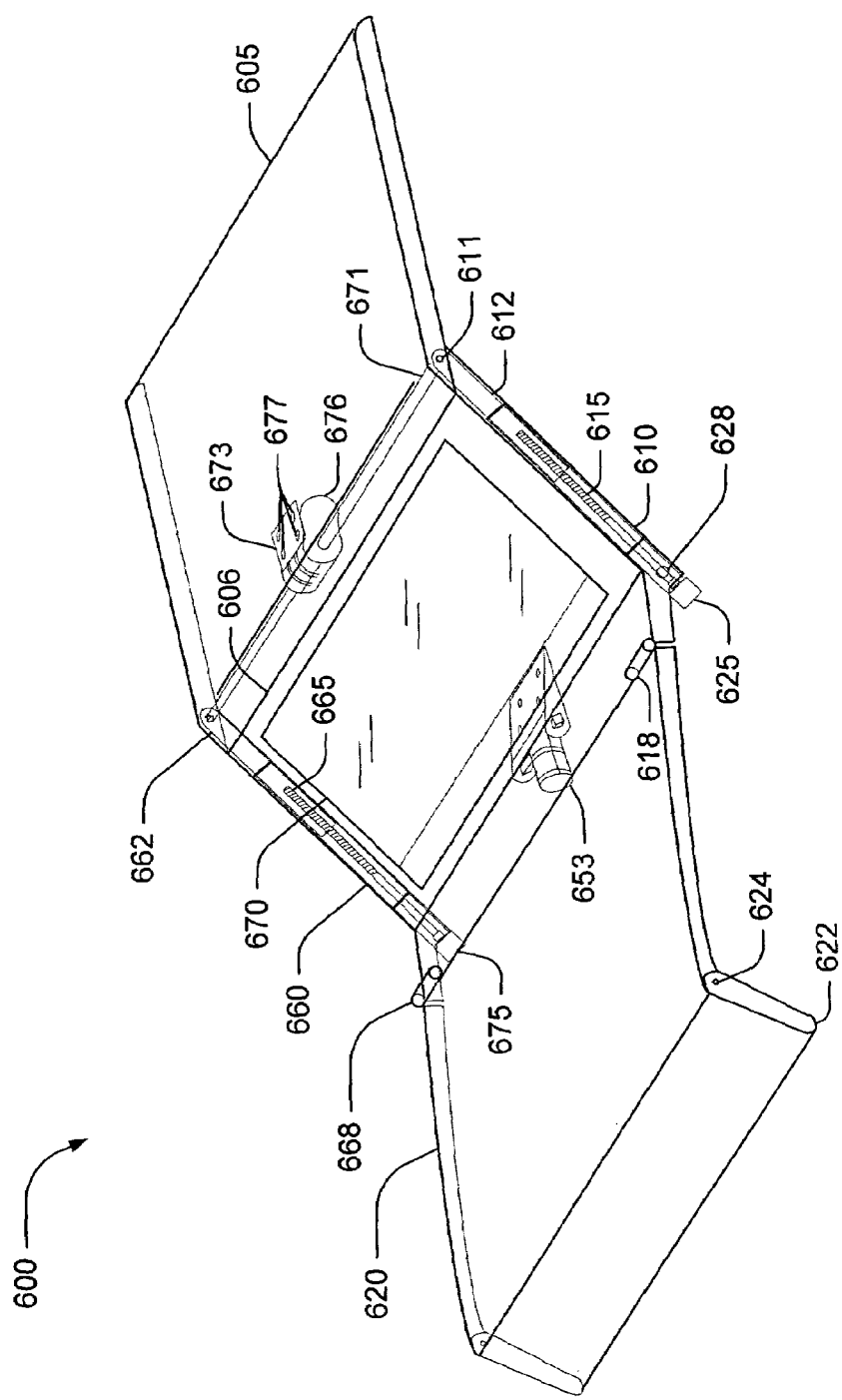
FIG. 13 is a perspective view of one preferred embodiment illustrating a threaded rod drive mechanism for each side of the roof portion driven from a single drive motor. Also illustrated is a drive motor at the top of the roof portion to drive movement of the upper roof portion in concert with the lower roof portion.

FIG. 13 illustrates a perspective view of a rotational control system 600, similar to that shown in FIG. 12, with like items designated similarly. In one embodiment of the present invention, the extension motors 625 and 675 that drive adjustable shafts 612 and 662 may be synchronously controlled and of low torque capacity. To drive the rotation of the lower roof portion 606 in relation to the upper storage lid 620, rotational gear motor assembly 653 may be utilized to rotate about fixed fulcrum 628. Gear motor 675 can reduce the load placed upon rotational motor assembly 653 by assisting in the retraction of the upper roof portion 605 with respect to the lower roof portion 606. In one embodiment, gear motor 676 is fixed to upper roof portion 605 by mounting plate 673 with four fasteners 677. The gear motor 676 utilizes a roof shaft 671 to pivot the upper roof portion 605 to become flush with respect to the surface of the lower roof portion 606 about hinge point 611. In one preferred embodiment, a spring mechanism may be added to assist in reducing the load placed upon the gear motor 676.

Figure 14:
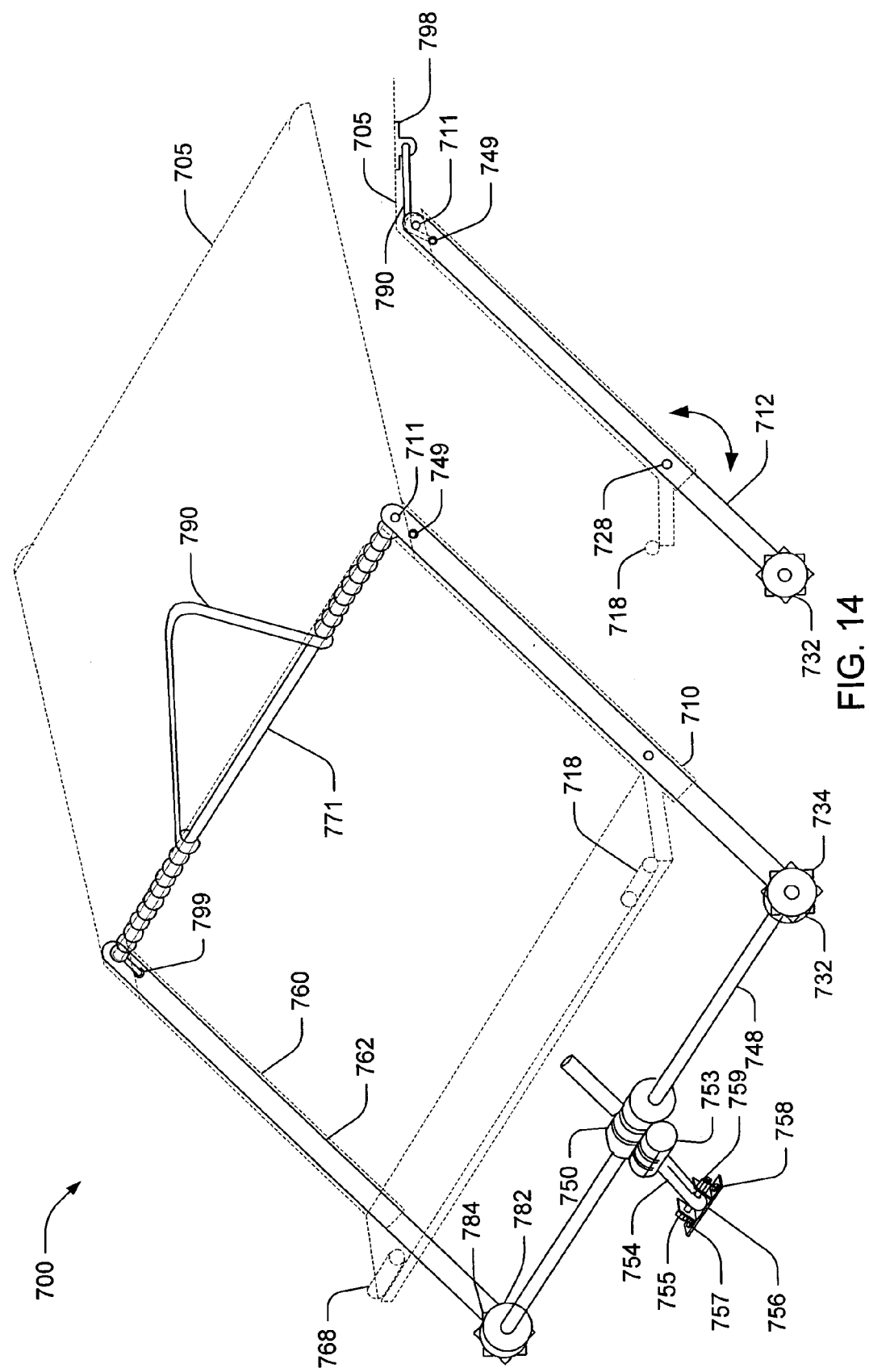
FIG. 14 is a perspective view of one preferred embodiment illustrating a cog and piston mechanism for each side of the roof portion driven from a single drive motor that is anchored to the vehicle. Also illustrated is a balancing spring mechanism at the top of the roof portion to facilitate movement of the upper roof portion in concert with the lower roof portion.

FIG. 14 illustrates a perspective view of a rotational control system 700, similar to that shown in FIG. 13, with like items designated similarly. Lower roof portion 706 is similar to 506, shown in FIG. 12. Hinges 518 and 568, shown in FIG. 12, are similar to hinges 718 and 768. Cogs 732 and 782, having tines 734 and 784, are similar to cogs 532 and 582, having tines 534 and 584. In one embodiment, the gear motor 675 of FIG. 13 is replaced by a spring 790 and gear box 753, to assist the load placed upon rotation motor 750. Spring 790 is coiled about roof shaft 771 that extends between the two sides of the hinge point 711 of the upper roof portion 705. Anchor holes 749 and 799 of the drive mechanisms 710 and 760 provide tension on the spring 790. The spring 790 is further anchored to upper roof portion 705 with roof plate 798. In one preferred embodiment, spring 790 is of steel construction or similar strength composite material.

Figure 15:
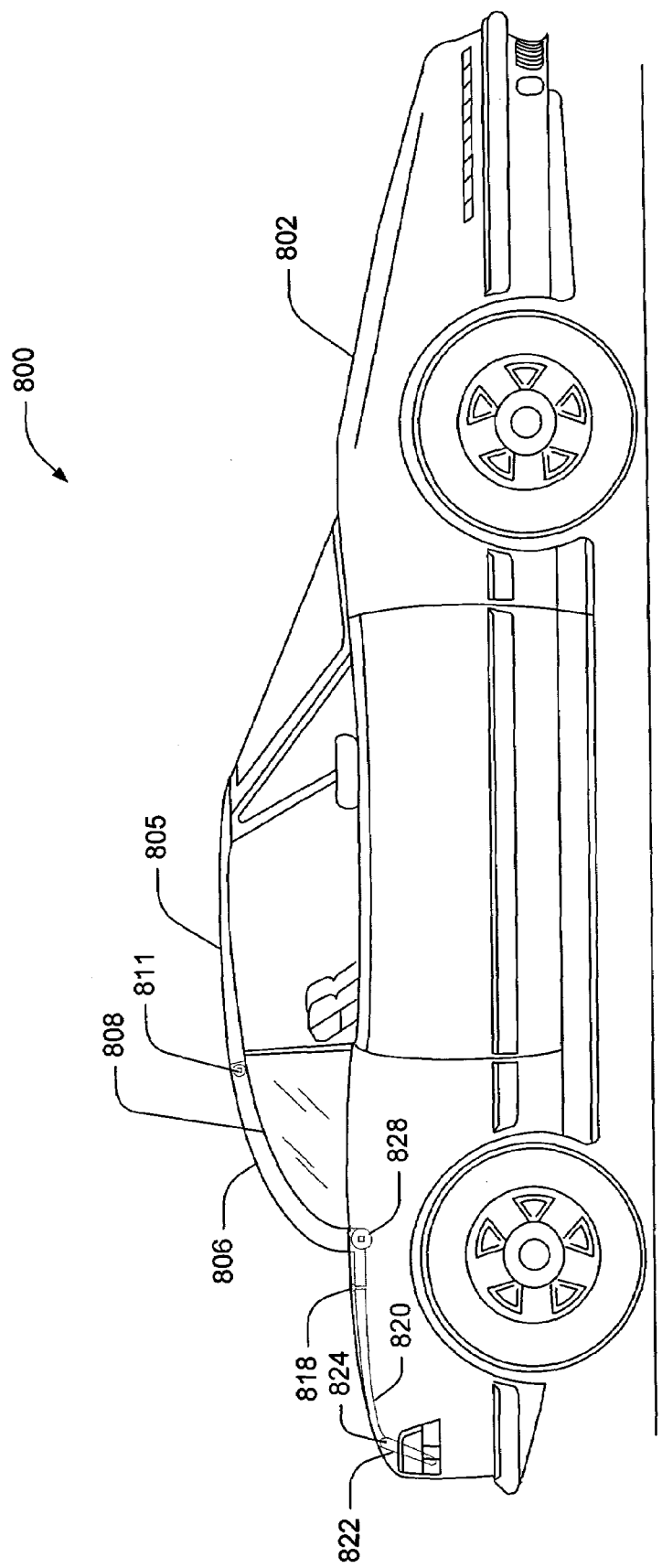
FIG. 15 is the side view of a vehicle with a rigid retractable roof, similar to FIG. 1, viewed in the closed position and having rear quarter panel windows that roll down into the vehicle body instead of retracting as part of the roof.
Figure 16:
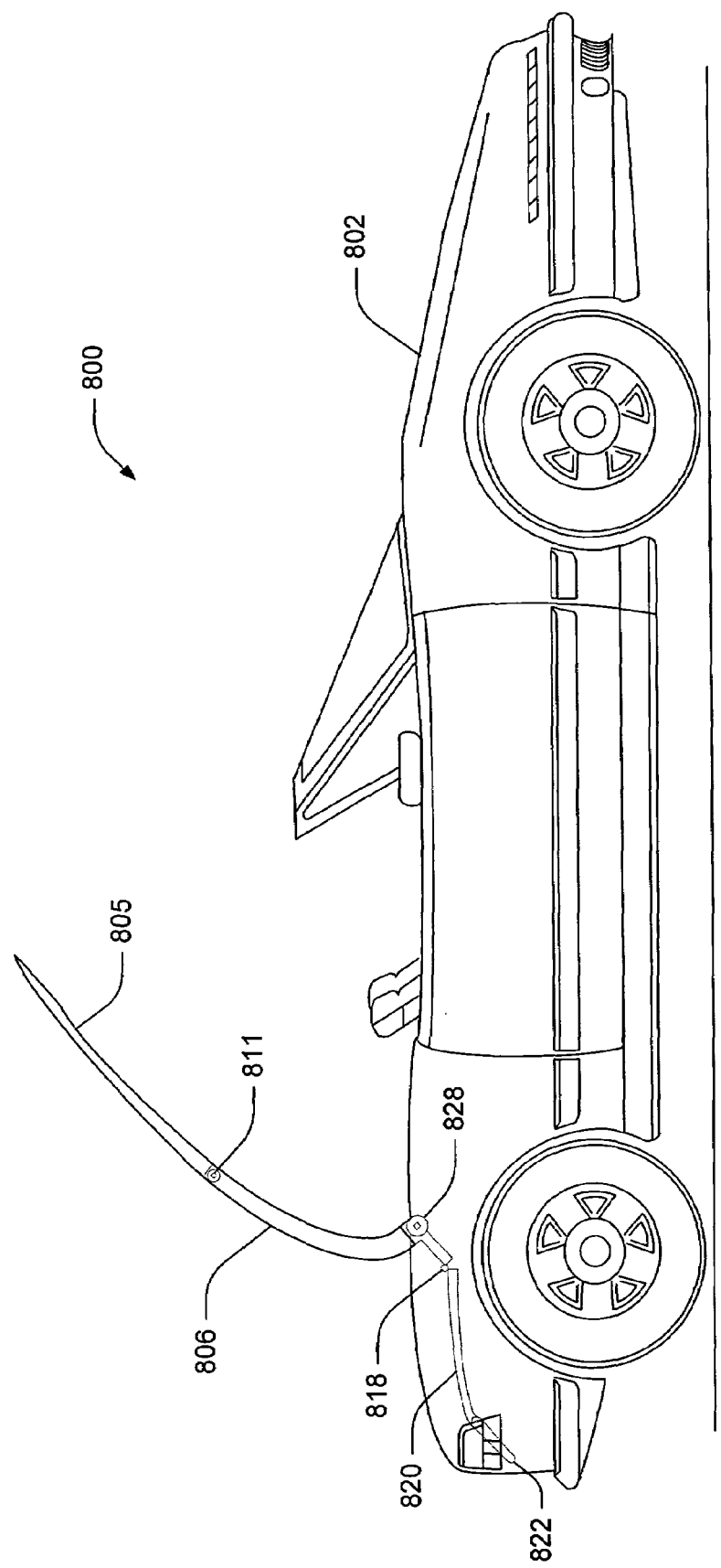
FIG. 16 is the side view of a vehicle with a rigid retractable roof, similar to FIG. 3, viewed as the roof portion moves from a closed to an open position and having rear quarter panel windows that roll down into the vehicle body instead of retracting as part of the roof.
Figure 17:
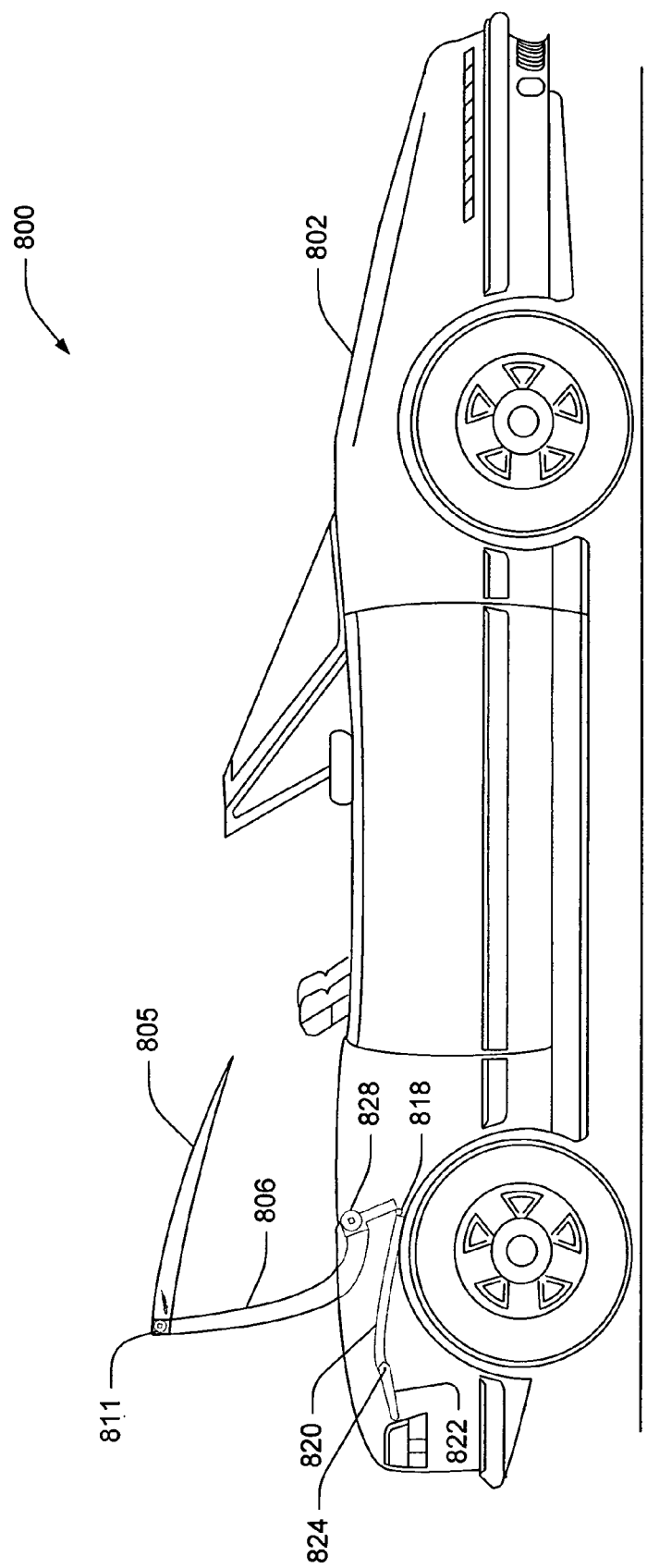
FIG. 17 is the side view of a vehicle with a rigid retractable roof, similar to FIG. 5, viewed as the roof portion moves from a closed to an open position and having rear quarter panel windows that roll down into the vehicle body instead of retracting as part of the roof.

FIGS. 15–17 illustrate a roof retracting system 800 similar in sequence to that of FIGS. 1, 3, and 5, with like items designated similarly. A vehicle 802 of such an embodiment having an upper roof portion 805 and lower roof portion 806 residing above a detached side window 808, pivoting at hinge point 811. During the process of moving the roof retracting system 800 from a closed position to an open position, the side window 808 is independently lowered into the vehicle body by manual or powered systems. Items 818, 820, 822, 824 and 828 are similar to like items 518, 520, 522, 524 and 528, respectively, as shown in FIG. 12.

Figure 18:
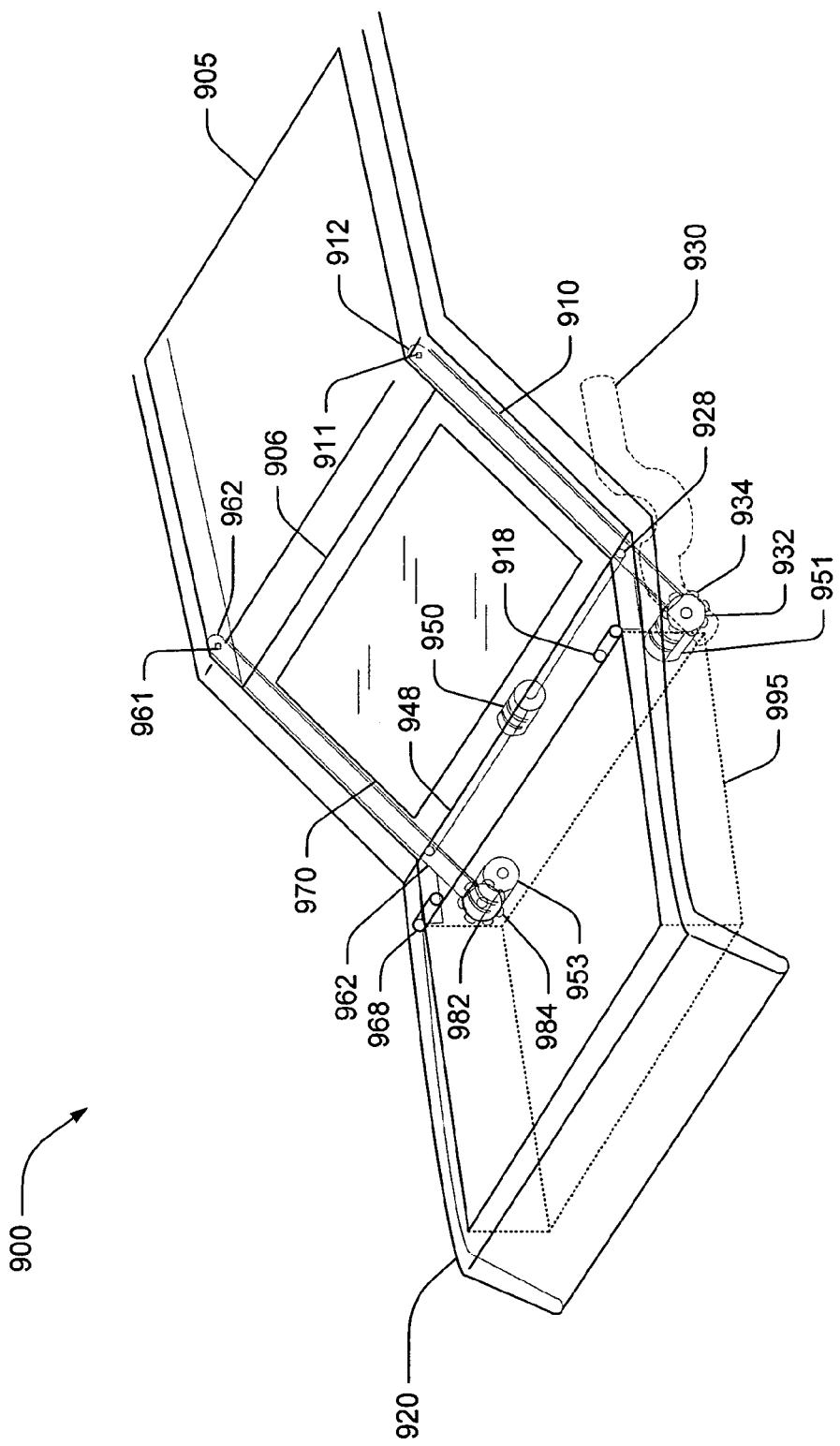
FIG. 18 is a perspective view of one preferred embodiment illustrating a cog and piston mechanism driven from multiple drive motors, similar to that shown in FIG. 13. Also illustrated is a storage space incorporated as part of the storage lid.
Figure 19:
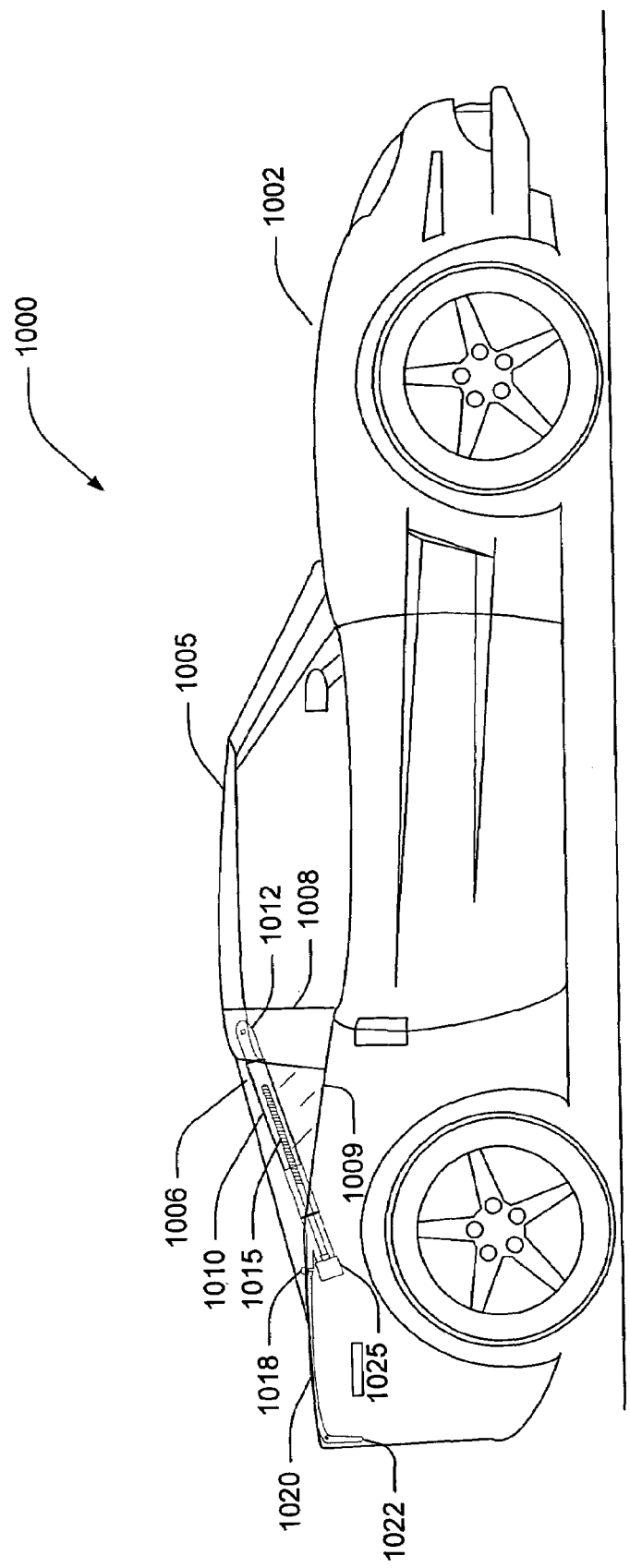
FIG. 19 is the side view of a vehicle with a rigid retractable roof, similar to FIG. 1, viewed before the roof portion moves from a closed to an open position and having the rear quarter panels remain in place.
Figure 20:
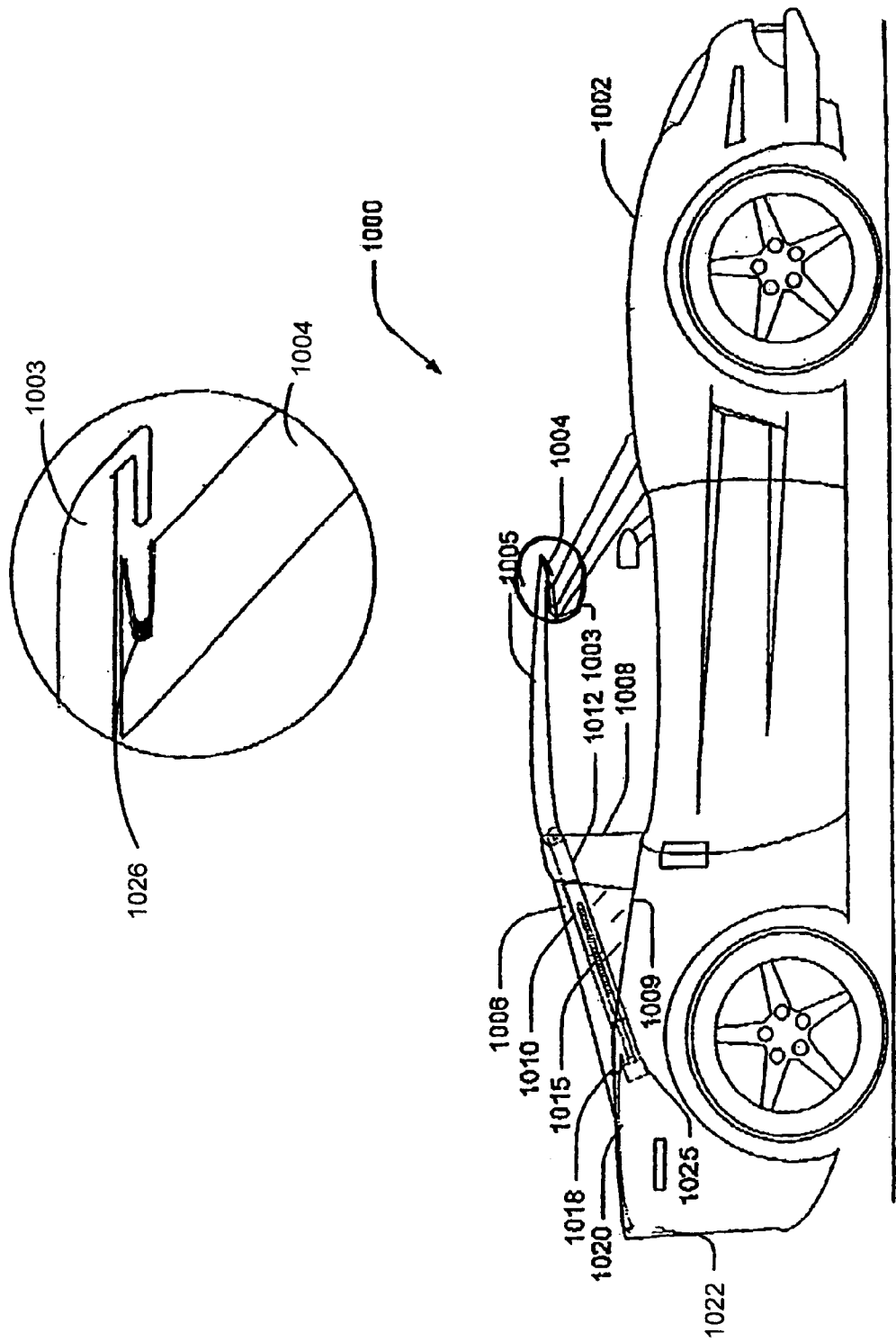
FIG. 20 is the side view of a vehicle with a rigid retractable roof, similar to FIG. 2, viewed as the roof portion moves from a closed to an open position and having the rear quarter panels remain in place.
Figure 21:
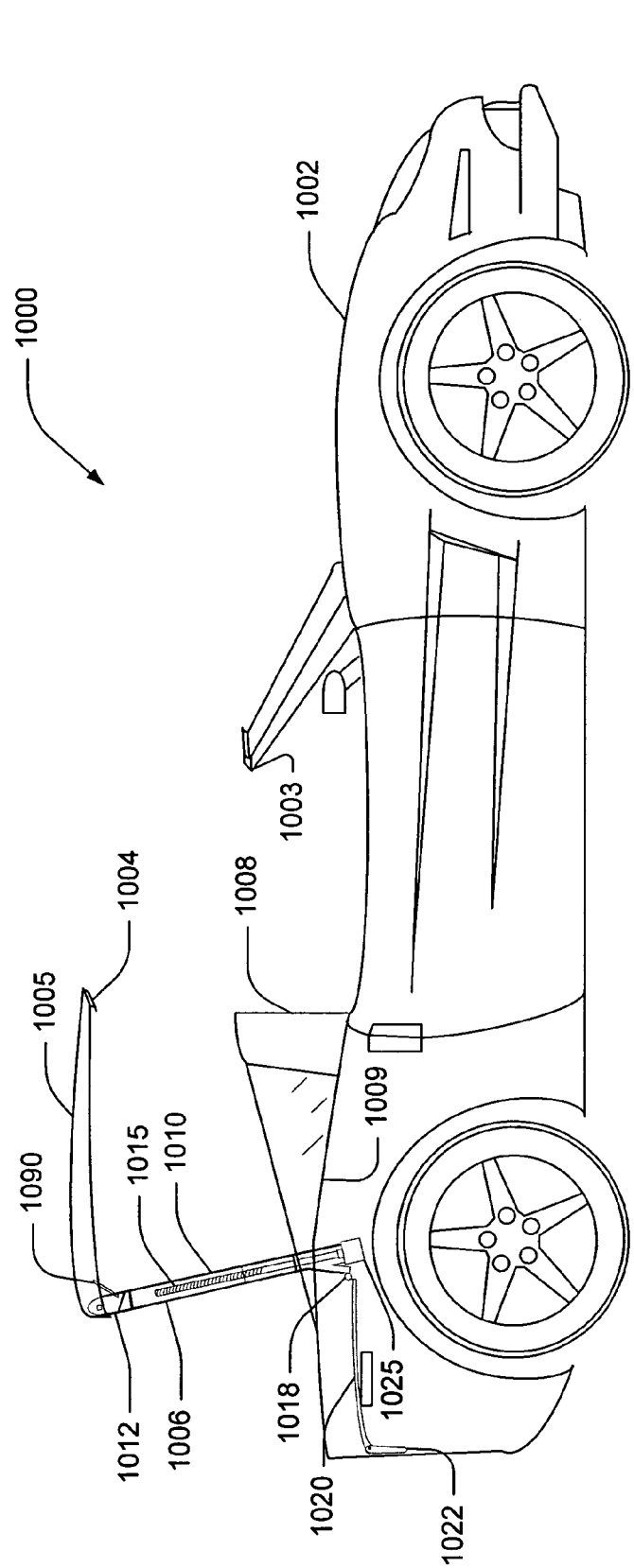
FIG. 21 is the side view of a vehicle with a rigid retractable roof, similar to FIG. 4, viewed as the roof portion moves from a closed to an open position and having the rear quarter panels remain in place.
Figure 22:
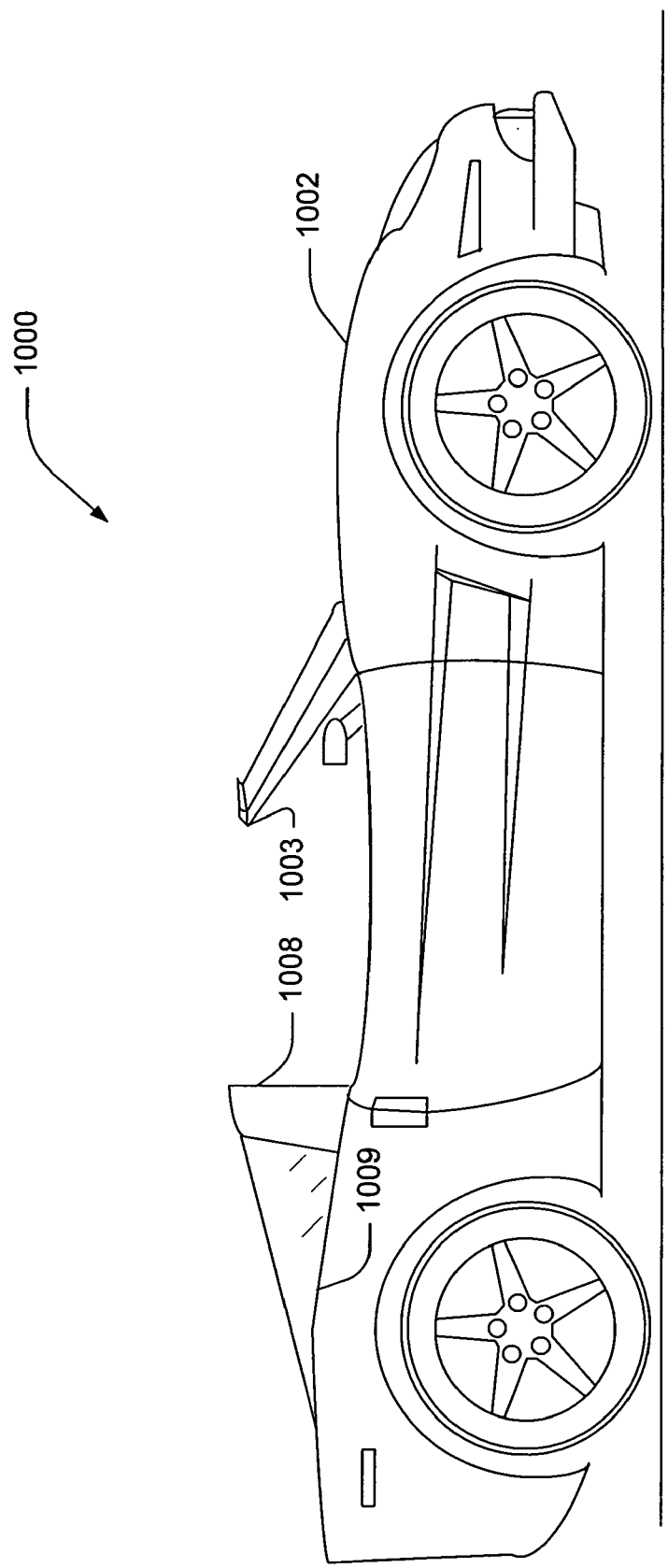
FIG. 22 is the side view of a vehicle with a rigid retractable roof, similar to FIG. 7, viewed in the open position and having the rear quarter panels remain in place.

FIG. 18 illustrates a perspective view of a roof retracting system 900, similar to FIG. 13, with like items designated similarly. According to one embodiment of the present invention, the rotation motor is mounted parallel to the axis of the fixed fulcrum 928 about shaft 948. Additionally, contained within the upper storage lid 920 is a storage space 995 of sufficient size to contain the upper and lower roof portions while in the open position. In one preferred embodiment, gear motor 950 may be utilized to assist in the retracting operation. Items designated as 905, 910, 906, 911, 912, 918, 930, 932, 934, 951, 953, 961, 962, 968, 970, 982 and 984 correspond to the similarly labeled designators as 505, 510, 506, 511, 512, 518, 530, 532, 534, 551, 553, 561, 562, 568, 570, 582 and 584, respectively, as shown in FIG. 12.

FIGS. 19–22 illustrate a side view of a roof retracting system 1000, similar to FIGS. 1, 2, 4 and 7, with like items designated similarly. According to one embodiment of the present invention, an upper roof portion 1005 of a vehicle 1002 incorporates only the center portion of a lower roof portion 1006, leaving a side panel 1008 that remains fixed during the movement from a closed to an open position. Alternatively, in one preferred embodiment there may be included a roll bar that remains intact, similar to that illustrated in FIG. 8. Also illustrated is a window portion 1009 that will remain adjacent to the side panel 1008. In one preferred embodiment, the continuous latching mechanism includes a roof hook 1004 that runs continuously along the front surface of the upper roof portion 1005. The roof hook 1004 mates with a corresponding continuous window frame latch or catch 1003 formed in one embodiment as a U- or V-shaped groove, located along the front surface when in the closed position. In one preferred embodiment, the catch 1003 preferably includes a gasket or seal 1026 within the groove to improve the mechanical seal as well as accommodate variation in the mating or registration of the upper roof portion 1005 and the catch 1003. The lower roof portion 1006 consists of only the center portion of the roof. This is similar to a roll bar design of FIG. 8 but having no frame between left and right side panels. It can be appreciated by those skilled in the art that various drive mechanisms may be implemented to assist in the movement from a closed position to an open position. Items designated as 1010, 1015, 1018, 1020, 1022 and 1025 correspond to the similarly labeled designators as 510, 515, 518, 520, 522, and 525, respectively, as shown in FIG. 12.

Figure 23:
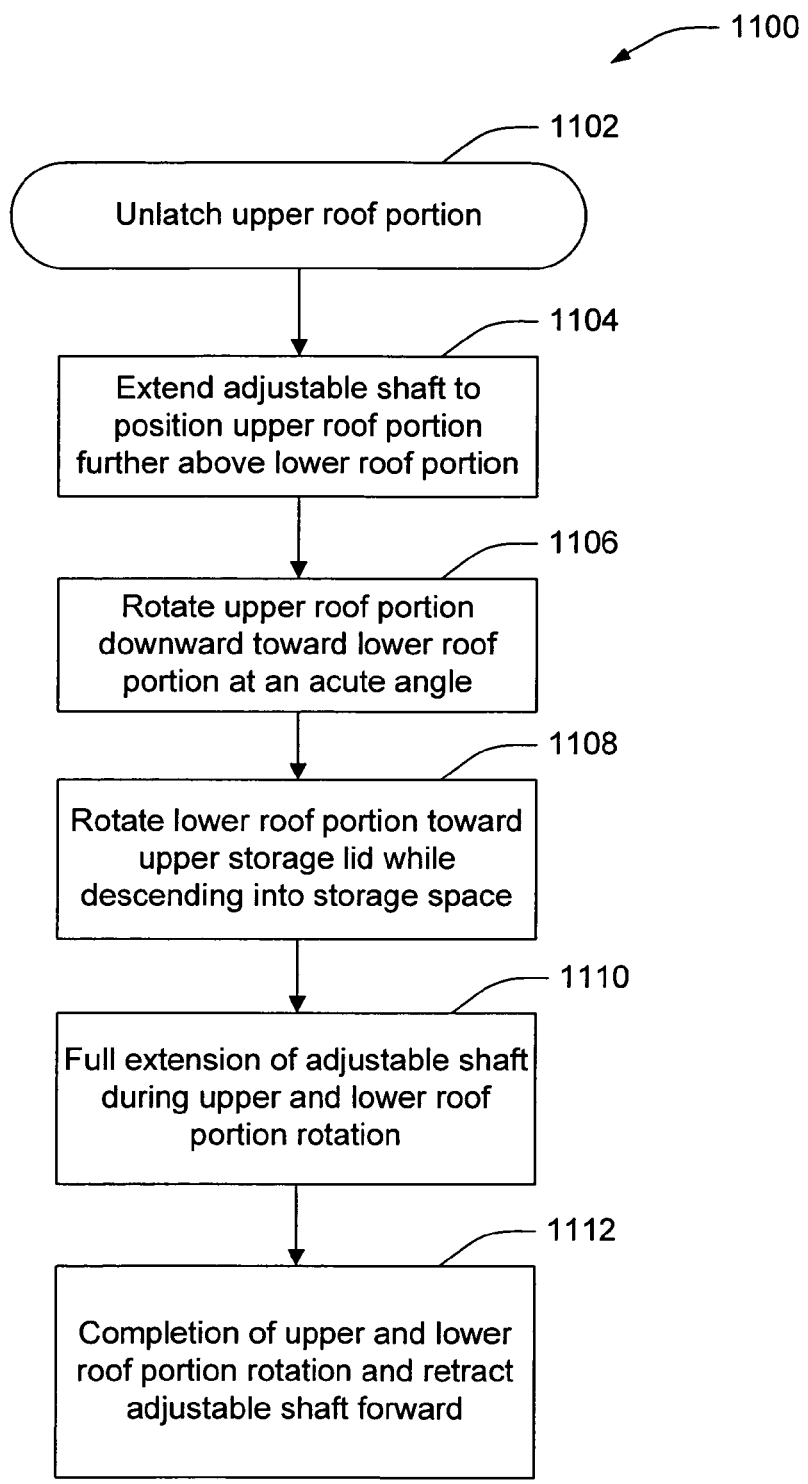
FIG. 23 is a flow diagram of a method of retracting a rigid vehicle roof from a closed to an open position utilizing a system similar to that illustrated in FIG. 1–7.

FIG. 23 shows a flow diagram 1100 illustrating a method of retracting a hard top roof of a vehicle in accordance with this invention. The unlatch step 1102 includes disconnecting the hook 104 of the upper roof portion 105 from the catch or window frame hole 103. The separation of the upper roof portion 105 from the frame hole 103 allows the extension of the adjustable shaft 112, in step 1104, thereby positioning the upper roof portion 105 further above the lower roof portion 106 to provide sufficient space to rotate, becoming more flush therewith. The rotation of upper and lower roof portions step 1106 begins to position the upper roof portion 105 to become flush with the surface of the lower roof portion 106 and leads to the rotate and descending step 1108. In step 1108, the lower roof portion 106 begins to become progressively more flush with respect to the surface of the upper storage lid 120 about the fixed fulcrum 228 at the upper hinge 118 and both upper roof portion 105 and lower roof portion 106. As the lower roof portion 106 continues to rotate, both upper storage lid 120 and lower storage lid 122 begin to descend downward into the storage space below the upper storage lid 120 and lower storage lid 122. In full extension step 1110, the adjustable shaft 112 is fully extended to allow increased separation of the upper roof portion 105 and the lower roof portion 106 at the pivot point 111. The purpose of the full extension is to allow the upper roof portion 105 and lower roof portion 106 to fold as flush with respect to one another as is possible for compact storage when the system reaches the open position. At the point the upper roof portion 105 and lower roof portion 106 become flush with the upper storage lid 120, step 1112 provides the retraction of the adjustable shaft 112 in a direction toward the front of the vehicle 102 until both the upper storage lid 120 and the lower storage lid 122 become fully descended downward toward the storage space of the vehicle 102. A latching or locking mechanism is incorporated to hold the portions in place while stored. Upon completion of the final step (1112), the side view of the open position of the roof retracting system 100 preserves the side profile of the vehicle 102 such that the rear storage area appears similarly to that viewed in the closed position.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular components such as drive motors and drive mechanisms may vary by manufacturer, having differing design tolerances, mounting requirements and packaging. The spring 790 may be of a different size or orientation, the spring 790 may be used to assist a drive motor or even eliminated altogether, if manual or motor control is preferred. Additionally, the common components such as fasteners and springs may have a wide range of operating range and tolerances which will affect the results in varying degrees. The particular components may be selected depending on the particular application for the roof system while maintaining substantially the same functionality without departing from the scope and spirit of the present invention. For example, it can be appreciated by those familiar with the art, that motors 125, 250, 551, 553, 650, and 675 are not required but instead may be substituted with hydraulic systems or moved by manual operation. In addition, although the preferred embodiment described herein is directed to a retracting roof for a vehicle resembling an automobile, it will be appreciated by those skilled in the art that the teachings of the present invention can be applied to other systems, like commercial, agricultural or utility vehicles without departing from the scope and spirit of the present invention.

What is claimed is:

1. A roof retracting apparatus for a vehicle, the roof retracting apparatus comprising:
    a rigid roof portion residing above a vehicle body in a closed position proximate a rearward storage space; and
    a lid residing above the storage space, adjacent to the roof portion and being configured to descend into the storage space as the roof portion moves to an open position above the lid while substantially preserving a vehicle side profile and permitting storage space access.

2. The roof retracting apparatus of claim 1 further comprising a reversible drive mechanism connected to the lid and to the roof portion and being configured to apply force for repositioning the roof portion between the closed and open positions.

3. The roof retracting apparatus of claim 2 wherein the drive mechanism comprises a threaded rod drive.

4. The roof retracting apparatus of claim 2 wherein the drive mechanism comprises a piston.

5. The roof retracting apparatus of claim 4 further comprising a first cog extending below and secured to the piston to direct travel of the piston along a track.

6. The roof retracting apparatus of claim 5 wherein the drive mechanism further comprises a second cog operatively coupled to the first cog and being configured to travel synchronously therewith.

7. The roof retracting apparatus of claim 5 further comprising a drive motor operatively secured to the first cog and configured and arranged to supply force sufficient to move the piston along the track.

8. The roof retracting apparatus of claim 7 further comprising a guide mechanism aligned with the motor to guide the movement of the drive mechanism, the guide mechanism comprising a sleeve attached to the drive motor and a guide rod operatively secured to the vehicle.

9. The roof retracting apparatus of claim 1 wherein the roof portion further comprises:
    an upper portion operatively secured to the vehicle body;
    a lower portion extending from the upper portion toward the lid; and
    a drive motor residing between the upper and lower portions, the drive motor being configured to apply force for directing the position of the upper and lower portions.

10. The roof retracting apparatus of claim 9 wherein the upper roof portion further comprises a shaft extending along the surface adjacent to the lower portion, the shaft further comprising a tension spring wherein the tension spring is operatively configured to provide tension for reducing the load on the drive motor during retraction.

11. The roof retracting apparatus of claim 9 further comprising a reversible drive mechanism connected to the lid and to the roof portion and being configured to apply force for repositioning the roof portion between the closed and open positions.

12. The retracting roof apparatus of claim 11 wherein the drive mechanism is located adjacent to the lower roof portion.

13. The retracting roof apparatus of claim 9 further comprising:
    a track operatively secured to the vehicle body;
    a cog configured and arranged to travel within the track;
    a drive mechanism comprising a piston extending from the cog toward the upper roof portion; and
    a shaft operatively coupled between the piston and the upper roof portion, the shaft being configured to apply force for repositioning the roof portion between the closed and open positions.

14. The retracting roof apparatus of claim 9 further comprising a threaded rod drive connected to the lid and to the upper roof portion and a motor operatively coupled to the threaded rod drive, the motor being configured to apply force for repositioning the roof portion between the closed and open positions.

15. The retracting roof apparatus of claim 1 wherein the upper roof portion further comprises:
    an upper portion operatively secured to the vehicle body;
    a lower portion extending from the upper portion to the storage lid; and
    a spring residing between the upper and lower portions, the spring being configured to apply force for directing the position of the upper and lower portions.

16. A method of retracting a rigid roof of a vehicle from a closed position to an open position for external storage over a storage space while preserving vehicle side profile and permitting storage space access, utilizing a roof portion having an upper and lower portion residing above the vehicle, a lid being operatively coupled to the lower roof portion and a drive mechanism connected to the lid and to the upper roof portion, the drive mechanism being configured to apply force sufficient for repositioning the upper and lower roof portions, the method of retracting comprising the steps of:
    extending the drive mechanism to elevate the upper roof portion above the lower roof portion;
    rotating the lower roof portion toward the lid about a fulcrum between the lower roof portion and the lid
    pivoting the upper and lower roof portions about a pivot point between the upper and lower roof portions by applied force; and
    recessing the lid while retracting.

17. The method of retracting of claim 16 wherein the pivoting step utilizes a spring to assist movement of the upper and lower roof portions.

18. The method of retracting of claim 17 wherein the pivoting step further utilizes a drive motor to assist movement of the upper and lower roof portions.

19. The method of retracting of claim 16 wherein the rotating step utilizes a drive motor to apply force for rotating the upper and lower roof portions.

20. The method of retracting of claim 16 further comprising a step of folding the upper roof portion flush with the lower roof portion.

21. The method of retracting of claim 18 further comprising a step of moving the upper and lower roof portions with the drive mechanism from a rearward position to a forward position for preserving vehicle side profile.

22. The roof retracting apparatus of claim 1, wherein the roof portion comprises:
   an upper portion operatively secured to the vehicle body, the upper portion having a front portion and having a hook extending along substantially an entire length of the front portion; and
   a lower portion extending from the upper portion to the storage lid,
   wherein the vehicle body comprises a window portion that defines a groove that is arranged to engage the hook.

23. The roof retracting apparatus of claim 22, wherein the window portion comprises a gasket located proximate the groove and arranged to form a watertight seal when the groove engages the hook.

* * * * *